(12) United States Patent
Sakata et al.

(10) Patent No.: US 7,782,854 B2
(45) Date of Patent: Aug. 24, 2010

(54) NETWORK SWITCHING APPARATUS, ROUTE MANAGEMENT SERVER, NETWORK INTERFACE APPARATUS, CONTROL METHOD THEREFOR, COMPUTER PROGRAM FOR ROUTE MANAGEMENT SERVER, AND COMPUTER-READABLE STORAGE MEDIUM

(75) Inventors: Tsuguhide Sakata, Kanagawa (JP); Yukichi Niwa, Chiba (JP); Kenji Nakamura, Tokyo (JP); Mitsuru Yamamoto, Kanagawa (JP); Noboru Yamamoto, Kanagawa (JP); Hiroyuki Yatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 947 days.

(21) Appl. No.: 10/912,131

(22) Filed: Aug. 6, 2004

(65) Prior Publication Data

US 2005/0089034 A1    Apr. 28, 2005

(30) Foreign Application Priority Data

Aug. 7, 2003    (JP)    ............................. 2003-289158
Jun. 16, 2004    (JP)    ............................. 2004-178403

(51) Int. Cl.
*H04L 12/28* (2006.01)
(52) U.S. Cl. ........................ 370/392; 370/401; 370/469; 709/221; 709/238
(58) Field of Classification Search ................. 370/392, 370/401, 389, 335, 230, 231, 237, 503, 507, 370/509–512, 223, 254, 412, 469, 229, 397; 709/234; 707/10
See application file for complete search history.

(56) References Cited

U.S. PATENT DOCUMENTS

| | | | | | |
|---|---|---|---|---|---|
| 5,428,615 | A | * | 6/1995 | Backes et al. | ................ 370/392 |
| 5,463,620 | A | * | 10/1995 | Sriram | ........................ 370/412 |
| 5,959,990 | A | * | 9/1999 | Frantz et al. | ................. 370/392 |

(Continued)

FOREIGN PATENT DOCUMENTS

CN    1388678 A    1/2003

(Continued)

OTHER PUBLICATIONS

Jangwoo son, Metro Optical Network—Trend & Technologies—Nov. 2001.*

(Continued)

*Primary Examiner*—Aung S Moe
*Assistant Examiner*—Vinncelas Louis
(74) *Attorney, Agent, or Firm*—Fitzpatrick, Cella, Harper & Scinto

(57) ABSTRACT

This invention constructs within the LAN a private area network (PAN) which is configured by terminal devices (personal computers and the like) of a specific group, is hardly influenced by the LAN traffic, and has high security. For this purpose, a PAN server which manages the communication route between specific terminals is installed within the LAN. The PAN server sets the communication route of each terminal device as label information, and causes switches and terminals to set pieces of label information generated for them. When the frame of data from a given port of each connection switch contains information representing PAN communication, the connection switch outputs the data to only a port specified by routing label information described in the frame.

5 Claims, 31 Drawing Sheets

U.S. PATENT DOCUMENTS

| | | | | |
|---|---|---|---|---|
| 6,085,238 | A * | 7/2000 | Yuasa et al. | 709/223 |
| 6,111,876 | A * | 8/2000 | Frantz et al. | 370/392 |
| 6,219,699 | B1 * | 4/2001 | McCloghrie et al. | 709/221 |
| 6,452,910 | B1 * | 9/2002 | Vij et al. | 370/310 |
| 6,526,052 | B1 * | 2/2003 | Rijhsinghani et al. | 370/389 |
| 6,798,775 | B1 * | 9/2004 | Bordonaro et al. | 370/392 |
| 6,862,280 | B1 * | 3/2005 | Bertagna | 370/392 |
| 6,892,243 | B1 * | 5/2005 | Skarpness | 709/234 |
| 7,061,911 | B2 * | 6/2006 | Furuno | 370/392 |
| 7,072,346 | B2 | 7/2006 | Hama | 370/395.53 |
| 7,082,102 | B1 * | 7/2006 | Wright | 370/229 |
| 7,133,402 | B2 | 11/2006 | Nomura et al. | 370/389 |
| 7,225,270 | B2 * | 5/2007 | Barr et al. | 709/238 |
| 7,266,124 | B2 * | 9/2007 | Kim et al. | 370/397 |
| 2003/0037163 | A1 * | 2/2003 | Kitada et al. | 709/236 |
| 2003/0189932 | A1 * | 10/2003 | Ishikawa et al. | 370/392 |
| 2003/0206518 | A1 * | 11/2003 | Yik et al. | 370/230 |
| 2003/0210671 | A1 * | 11/2003 | Eglin | 370/338 |
| 2004/0042416 | A1 * | 3/2004 | Ngo et al. | 370/254 |
| 2004/0202171 | A1 * | 10/2004 | Hama | 370/395.1 |
| 2004/0243670 | A1 | 12/2004 | Grimminger et al. | |
| 2004/0264505 | A1 * | 12/2004 | Miki et al. | 370/469 |
| 2005/0246347 | A1 * | 11/2005 | Kobayashi | 707/10 |
| 2007/0286198 | A1 * | 12/2007 | Muirhead et al. | 370/392 |
| 2008/0037546 | A1 * | 2/2008 | Ishikawa et al. | 370/392 |

FOREIGN PATENT DOCUMENTS

| | | |
|---|---|---|
| JP | 2002-164937 A | 6/2002 |
| JP | 2003-032280 A | 1/2003 |
| WO | WO 03/007484 A2 | 1/2003 |

OTHER PUBLICATIONS

U.S. Appl. No. 09/363,025, filed Jul. 7, 1999.
U.S. Appl. No. 09/823,990, filed Apr. 4, 2001.

* cited by examiner

F I G. 5A

CONNECTION ROUTES OF ALL DEVICES MANAGED BY PAN SERVER 31

| FROM DEVICE 45 | SWITCH41 | | CONNECTION | SWITCH32 | | CONNECTION | ROUTING LABEL | DESTINATION |
|---|---|---|---|---|---|---|---|---|
| | INPUT | OUTPUT | | INPUT | OUTPUT | | | |
| | PORT1 | PORT2 | DEVICE10 | PORT1 | | | | |
| | | PORT5 | LINK | | PORT4 | PAN SERVER | L1 | DEVICE46 |
| | | | | | PORT5 | DEVICE38 | L2 | PAN SERVER |
| | | | | | PORT6 | DEVICE39 | L3 | DEVICE38 |
| | | | | | PORT7 | DEVICE40 | L4 | DEVICE39 |
| | | | | | | | L5 | DEVICE40 |

| FROM DEVICE 46 | SWITCH41 | | CONNECTION | SWITCH32 | | CONNECTION | ROUTING LABEL | DESTINATION |
|---|---|---|---|---|---|---|---|---|
| | INPUT | OUTPUT | | INPUT | OUTPUT | | | |
| | PORT2 | PORT1 | DEVICE1 | PORT1 | | | | |
| | | PORT5 | LINK | | PORT4 | PAN SERVER | L6 | DEVICE45 |
| | | | | | PORT5 | DEVICE38 | L7 | PAN SERVER |
| | | | | | PORT6 | DEVICE39 | L8 | DEVICE38 |
| | | | | | PORT7 | DEVICE40 | L9 | DEVICE39 |
| | | | | | | | L10 | DEVICE40 |

| FROM DEVICE 38 | SWITCH32 | | CONNECTION | SWITCH41 | | CONNECTION | ROUTING LABEL | DESTINATION |
|---|---|---|---|---|---|---|---|---|
| | INPUT | OUTPUT | | INPUT | OUTPUT | | | |
| | PORT5 | PORT1 | LINK | PORT5 | PORT1 | DEVICE45 | L11 | DEVICE45 |
| | | PORT4 | PAN SERVER | | PORT2 | DEVICE46 | L12 | DEVICE46 |
| | | PORT6 | DEVICE39 | | | | L13 | PAN SERVER |
| | | PORT7 | DEVICE40 | | | | L14 | DEVICE39 |
| | | | | | | | L15 | DEVICE40 |

FIG. 5B

FROM DEVICE 39

| SWITCH32 | | | SWITCH41 | | | | |
|---|---|---|---|---|---|---|---|
| INPUT | OUTPUT | CONNECTION | INPUT | OUTPUT | CONNECTION | ROUTING LABEL | DESTINATION |
| PORT6 | PORT1 | LINK | PORT5 | PORT1 | DEVICE1 | L16 | DEVICE45 |
| | PORT4 | PAN SERVER | | PORT2 | DEVICE2 | L17 | DEVICE46 |
| | PORT5 | DEVICE38 | | | | L18 | PAN SERVER |
| | PORT7 | DEVICE40 | | | | L19 | DEVICE38 |
| | | | | | | L20 | DEVICE40 |

FROM DEVICE 40

| SWITCH32 | | | SWITCH41 | | | | |
|---|---|---|---|---|---|---|---|
| INPUT | OUTPUT | CONNECTION | INPUT | OUTPUT | CONNECTION | ROUTING LABEL | DESTINATION |
| PORT7 | PORT1 | LINK | PORT5 | PORT1 | DEVICE1 | L21 | DEVICE45 |
| | PORT4 | PAN SERVER | | PORT2 | DEVICE2 | L22 | DEVICE46 |
| | PORT5 | DEVICE38 | | | | L23 | PAN SERVER |
| | PORT6 | DEVICE39 | | | | L24 | DEVICE38 |
| | | | | | | L25 | DEVICE39 |

FROM PAN SERVER 31

| SWITCH32 | | | SWITCH41 | | | | |
|---|---|---|---|---|---|---|---|
| INPUT | OUTPUT | CONNECTION | INPUT | OUTPUT | CONNECTION | ROUTING LABEL | DESTINATION |
| PORT4 | PORT5 | DEVICE38 | PORT5 | PORT1 | DEVICE1 | L26 | DEVICE45 |
| | PORT6 | DEVICE39 | | PORT2 | DEVICE2 | L27 | DEVICE46 |
| | PORT7 | DEVICE40 | | | | L28 | DEVICE38 |
| | | | | | | L29 | DEVICE39 |
| | | | | | | L30 | DEVICE40 |

FIG. 7A

ROUTING LABEL TABLE DISTRIBUTED BY PAN SERVER 31 TO EACH DEVICE

FROM DEVICE 45

| DESTINATION | ROUTING LABEL | CONNECTION SWITCH | CONNECTION SWITCH |
|---|---|---|---|
| DEVICE46 | L1 | 41 | NONE |
| PAN SERVER | L2 | 41 | 32 |
| DEVICE38 | L3 | 41 | 32 |
| DEVICE39 | L4 | 41 | 32 |
| DEVICE40 | L5 | 41 | 32 |

FROM DEVICE 46

| DESTINATION | ROUTING LABEL | CONNECTION SWITCH | CONNECTION SWITCH |
|---|---|---|---|
| DEVICE45 | L6 | 41 | NONE |
| PAN SERVER | L7 | 41 | 32 |
| DEVICE38 | L8 | 41 | 32 |
| DEVICE39 | L9 | 41 | 32 |
| DEVICE40 | L10 | 41 | 32 |

FROM DEVICE 38

| DESTINATION | ROUTING LABEL | CONNECTION SWITCH | CONNECTION SWITCH |
|---|---|---|---|
| DEVICE45 | L11 | 32 | 41 |
| DEVICE46 | L12 | 32 | 41 |
| PAN SERVER | L13 | 32 | NONE |
| DEVICE39 | L14 | 32 | NONE |
| DEVICE40 | L15 | 32 | NONE |

FIG. 7B

FROM DEVICE 39

| DESTINATION | ROUTING LABEL | CONNECTION SWITCH | CONNECTION SWITCH |
|---|---|---|---|
| DEVICE45 | L16 | 32 | 41 |
| DEVICE46 | L17 | 32 | 41 |
| PAN SERVER | L18 | 32 | NONE |
| DEVICE38 | L19 | 32 | NONE |
| DEVICE40 | L20 | 32 | NONE |

FROM DEVICE 40

| DESTINATION | ROUTING LABEL | CONNECTION SWITCH | CONNECTION SWITCH |
|---|---|---|---|
| DEVICE45 | L21 | 32 | 41 |
| DEVICE46 | L22 | 32 | 41 |
| PAN SERVER | L23 | 32 | NONE |
| DEVICE38 | L24 | 32 | NONE |
| DEVICE39 | L25 | 32 | NONE |

FROM PAN SERVER 31

| DESTINATION | ROUTING LABEL | CONNECTION SWITCH | CONNECTION SWITCH |
|---|---|---|---|
| DEVICE45 | L26 | 32 | 41 |
| DEVICE46 | L27 | 32 | 41 |
| DEVICE38 | L28 | 32 | NONE |
| DEVICE39 | L29 | 32 | NONE |
| DEVICE40 | L30 | 32 | NONE |

FIG. 8A

ROUTING LABEL TABLE DISTRIBUTED BY PAN SERVER TO EACH SWITCH
CONNECTION SWITCH 41

| INPUT PORT | ROUTING LABEL | OUTPUT PORT |
|---|---|---|
| PORT1 | L1 | PORT2 |
| | L2 | PORT5 |
| | L3 | |
| | L4 | |
| | L5 | |
| PORT2 | L6 | PORT1 |
| | L7 | PORT5 |
| | L8 | |
| | L9 | |
| | L10 | |
| PORT5 | L11 | PORT1 |
| | L12 | PORT2 |
| | L13 | |
| | L14 | |
| | L15 | |
| PORT5 | L16 | PORT1 |
| | L17 | PORT2 |
| | L18 | |
| | L19 | |
| | L20 | |
| PORT5 | L21 | PORT1 |
| | L22 | PORT2 |
| | L23 | |
| | L24 | |
| | L25 | |
| PORT5 | L26 | PORT1 |
| | L27 | PORT2 |
| | L28 | |
| | L29 | |
| | L30 | |

FIG. 8B

CONNECTION SWITCH 32

| INPUT PORT | ROUTING LABEL | OUTPUT PORT |
|---|---|---|
| ///////// | L1 | ///////// |
| PORT1 | L2 | PORT4 |
| | L3 | PORT5 |
| | L4 | PORT6 |
| | L5 | PORT7 |
| ///////// | L6 | ///////// |
| PORT1 | L7 | PORT4 |
| | L8 | PORT5 |
| | L9 | PORT6 |
| | L10 | PORT7 |
| PORT5 | L11 | PORT1 |
| | L12 | PORT1 |
| | L13 | PORT4 |
| | L14 | PORT6 |
| | L15 | PORT7 |
| PORT6 | L16 | PORT1 |
| | L17 | PORT1 |
| | L18 | PORT4 |
| | L19 | PORT5 |
| | L20 | PORT7 |
| PORT7 | L21 | PORT1 |
| | L22 | PORT1 |
| | L23 | PORT4 |
| | L24 | PORT5 |
| | L25 | PORT6 |
| PORT4 | L26 | PORT1 |
| | L27 | PORT1 |
| | L28 | PORT5 |
| | L29 | PORT6 |
| | L30 | PORT7 |

FIG. 11A

ROUTING LABEL TABLE OF PAN 1

| INPUT PORT | ROUTING LABEL | OUTPUT PORT |
|---|---|---|
| PORT1 | L1 | PORT3 |
| | L2 | PORT9 |
| | L3 | PORT14 |
| | L4 | PORT16 |
| PORT3 | L5 | PORT1 |
| | L6 | PORT9 |
| | L7 | PORT14 |
| | L8 | PORT16 |
| PORT9 | L9 | PORT1 |
| | L10 | PORT3 |
| | L11 | PORT14 |
| | L12 | PORT16 |
| PORT14 | L13 | PORT1 |
| | L14 | PORT3 |
| | L15 | PORT9 |
| | L16 | PORT16 |
| PORT16 | L17 | PORT1 |
| | L18 | PORT3 |
| | L19 | PORT9 |
| | L20 | PORT14 |

FIG. 11B

ROUTING LABEL TABLE OF PAN 2

| INPUT PORT | ROUTING LABEL | OUTPUT PORT |
|---|---|---|
| PORT3 | L1 | PORT4 |
| | L2 | PORT6 |
| | L3 | PORT8 |
| | L4 | PORT9 |
| | L5 | PORT12 |
| PORT4 | L6 | PORT3 |
| | L7 | PORT6 |
| | L8 | PORT8 |
| | L9 | PORT9 |
| | L10 | PORT12 |
| PORT6 | L11 | PORT3 |
| | L12 | PORT4 |
| | L13 | PORT8 |
| | L14 | PORT9 |
| | L15 | PORT12 |
| PORT8 | L16 | PORT3 |
| | L17 | PORT4 |
| | L18 | PORT6 |
| | L19 | PORT9 |
| | L20 | PORT12 |
| PORT9 | L21 | PORT3 |
| | L22 | PORT4 |
| | L23 | PORT6 |
| | L24 | PORT8 |
| | L25 | PORT12 |
| PORT12 | L26 | PORT3 |
| | L27 | PORT4 |
| | L28 | PORT6 |
| | L29 | PORT8 |
| | L30 | PORT9 |

FIG. 16
1. COMMUNICATION START STATE
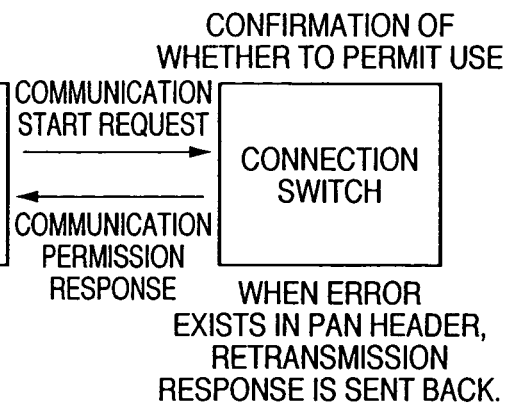
2. LABEL COMMUNICATION STATE
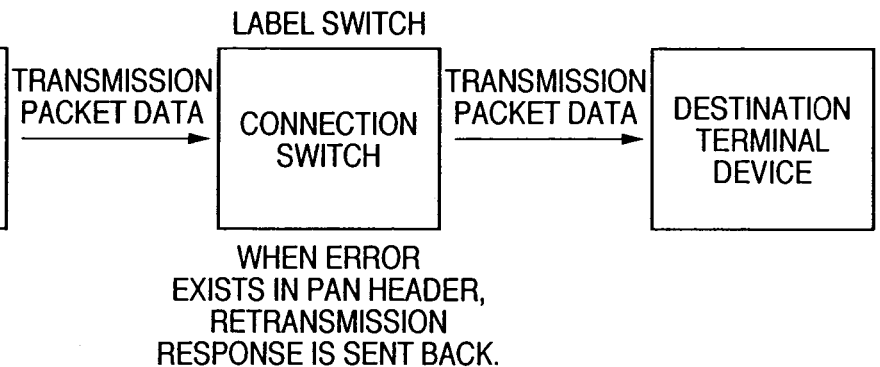
3. COMMUNICATION END STATE
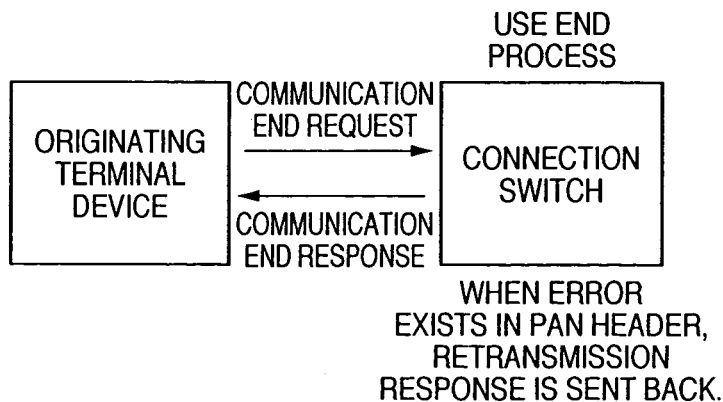

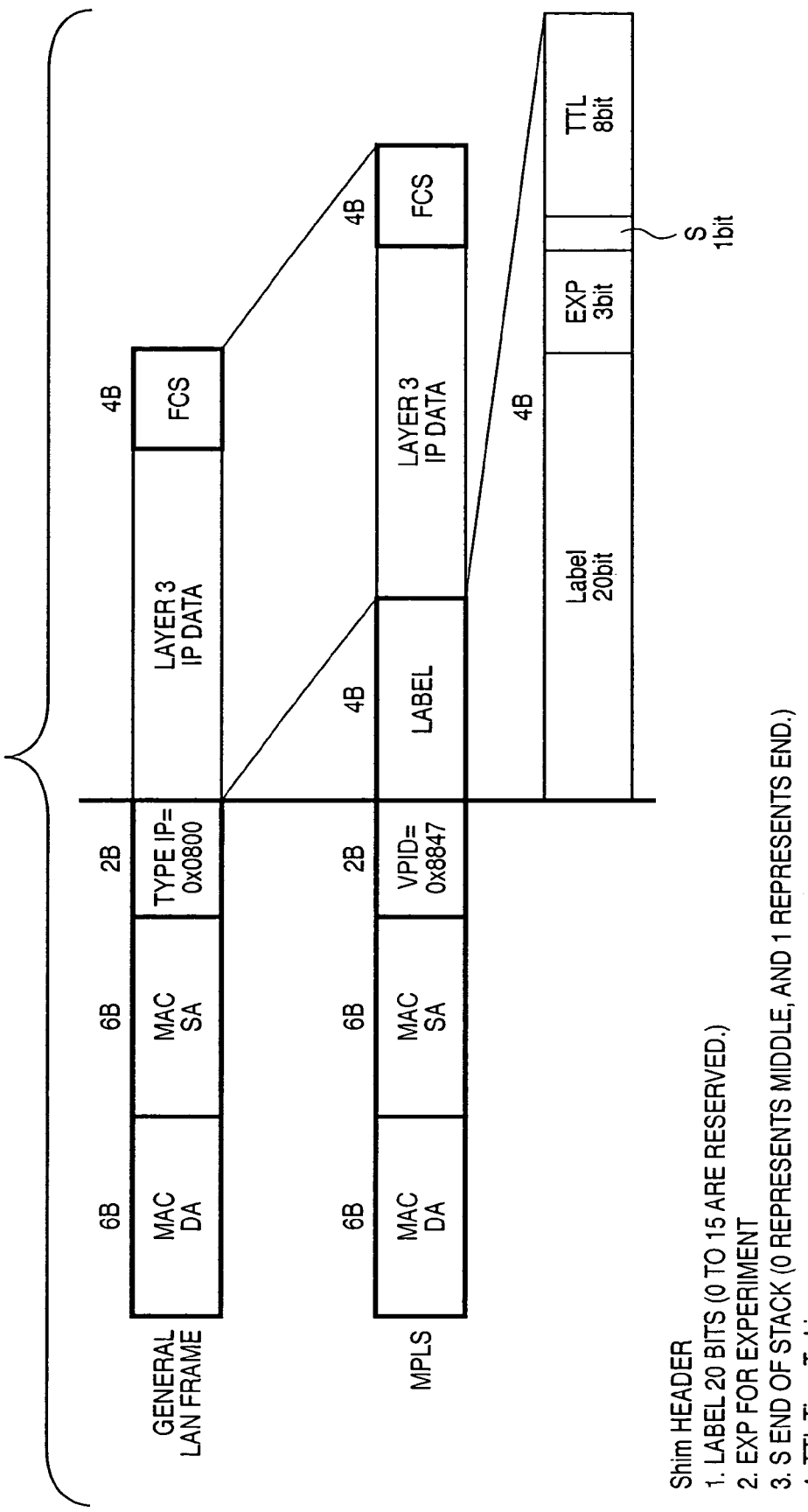

PAN ID SETTING

| PAN NAME : | PROJECT X |
| --- | --- |
| PAN TYPE : | ⦿ ISO PAN   ○ BULK PAN |
| PAN PRIORITY : | 1 |
| PAN IDENTIFIER : | 0001 |

NETWORK SWITCHING APPARATUS, ROUTE MANAGEMENT SERVER, NETWORK INTERFACE APPARATUS, CONTROL METHOD THEREFOR, COMPUTER PROGRAM FOR ROUTE MANAGEMENT SERVER, AND COMPUTER-READABLE STORAGE MEDIUM

FIELD OF THE INVENTION

The present invention relates to a technique of virtually or logically configuring within the LAN a network dedicated to use among specific group members, and a technique of performing routing using a label in packet communication.

BACKGROUND OF THE INVENTION

These days, general-purpose information processing apparatuses such as a personal computer (to be simply referred to as a PC hereinafter) have become tools necessary for daily work, and create and edit many data every day. At present, sharing of information and various devices (printer and the like) is indispensable, and PCs are connected to a LAN (Local Area Network) ("IDG Information Communication Series: 10 Gigabit Ethernet Textbook" published by IDG Japan, "IDG Information Communication Series: Multiprotocol Label Switching Textbook" published by IDG Japan, and "Microsoft Windows2000 Server Resource Kit" published by Nikkei BP SoftPress).

When a LAN is constructed, PCs, i.e., client terminal devices (to be referred to as client devices hereinafter) used by users and a server computer (to be referred to as a server device hereinafter) exist on the LAN. These devices are connected by a connection device (switching hub: to be simply referred to as a switch hereinafter) to share data via the server device.

Information as an individual product created by a PC is utilized as shared data in a group, subjected to correction, reference, and improvement, and stored as precise results in a database shared within the group.

The server-client environment using the LAN has rapidly spread in office. A client PC is set on the desk of each worker, whereas the server is installed in a server room managed by the administrator and provides a data infrastructure for daily work. Data sharing in the company LAN produces a high added value which can be achieved not by an individual but by cooperative work (collaboration). Data sharing becomes the core of business activity.

The LAN environment has rapidly been developed as the information infrastructure of the company, and at present has reached a large scale in which almost all workers in the company participate in this environment.

Recently, terminal devices of a new type which assume common use in LAN connection become available along with the spread of the LAN infrastructure. Preferable examples are a network camera and video distribution server. Such device distributes a relatively large volume of color moving picture data by streaming to the LAN, and a PC receives and displays the data.

As the LAN scale becomes large, new needs arise in the company LAN.

One of the needs is a demand for virtually configuring a dedicated network used among specific members in the company, i.e., a network for a specific group.

In particular, this need is strong among members of a specific group such as a human resources group, manager group, or project group which treats confidential information. Jobs among specific members often have contents with high priority, and thus are desirably processed preferentially to LAN packets.

A need from another viewpoint is a demand for separating the traffic between an image terminal device and a general terminal in order to prevent traffic congestion due to image data streaming distribution caused by an image-associated terminal device (multimedia terminal device) present in the LAN. This need is strong especially in, e.g., a design or development group in which visual communication is indispensable for work. The current LAN processes streaming data similarly to general data packets. Images may be omitted due to a congestion delay of data packets unless the data compression ratio is increased. However, an increase in compression ratio degrades the image quality, and there are needs for separation of stream data, and a priority process for separated stream data that is different from a priority process for general packets.

These needs are summarized into a technical demand "a network configured by only specific terminal devices subjected to a priority process is implemented in a general LAN".

The first need is the implementation of a private area network within the LAN that is configured by terminal devices (personal computers) used by specific members with high secureness. In other words, the first need is the implementation of channel separation of the data traffic within a specific group from the general LAN traffic for the purpose of security. This need also arises for a priority process for the traffic separated from the LAN traffic.

The second need is the implementation of a private area network within the LAN that is configured by specific multimedia terminal devices. In other words, the second need is the implementation of channel separation between streaming data and general LAN data. This need also arises for a priority process for stream data over general packets.

These needs are summed up into the following requirements for a private area network within the LAN.

1. A terminal device in a specific group must be accessible to a company information terminal device within the LAN.
2. An outsider terminal device within the LAN must not be accessible to a terminal device in a specific group.
3. Terminal devices in different specific groups must not be accessible to each other.
4. A specific group packet is processed preferentially to a LAN packet.

That is, the priority is set to "specific group packet>LAN packet".

5. A stream packet from a specific group is processed preferentially to a general packet.

That is, the priority is set to "stream of specific group>general packet of specific group".

From requirement 1, an area network for a specific terminal device group must be virtually configured within the LAN instead of configuring an area network independently of the company LAN.

In order to implement a virtual private area network within the LAN, the following methods are taken.

1. A dedicated domain is created for terminal devices of a specific group and managed by a dedicated server.
2. A company LAN is configured with a single domain, and a specific group is formed and managed as a user group.

According to the first method, since a domain different from that of a general LAN in the company is set, user names, passwords, and the like dedicated to the domain of the specific group can be used.

According to the second method, since a specific group is one of user groups within a single domain, user names, passwords, and the like are set for only the single domain. Management of access to a resource by the specific group depends on rights setting of the specific group in the domain server.

These methods suffer the following problems.

User authentication is group management on the basis of the user name and password of the specific group to the dedicated domain in the first method, and similarly on the basis of the authentication result of the user name and password in log-on to the single LAN domain in the second method.

In either case, access is managed on the basis of authentication of "user name and password", which is weak in the company LAN.

The company holds public information on an individual such as the employee number, extension number, and position, and the department holds an address book and the like. It is not difficult to break a password by analogy based on the public information.

That is, the security of password management is not strong in the company LAN.

In addition, the IP communication method in the current LAN has a security problem. IP communication broadcasts address information of a terminal device. Any terminal devices can be connected to communicate with each other as far as they are electrically connected to the LAN. Access management is performed on the session layer, which is a fundamental problem. The current LAN transmits data by an IEEE 802.3 Ethernet® method. The feature of this communication method is based on a media access control (MAC) address corresponding to MAC and an IP address corresponding to the data link layer. The IP address represents the final transmission destination address, and the MAC address represents the next transfer destination address in each transmission step. Since the MAC address must be acquired from the IP address of a partner device, an ARP (Address Resolution Protocol) is adopted. This protocol makes it possible to transmit data by the MAC address as far as the partner device falls within the subnet range. If the partner device falls outside the subnet range, a router is interposed, and the first transmission destination becomes the MAC address of the router.

The originating IP address and originating MAC address of a terminal device must be set in a transmission packet in order to receive a response from the partner device. As a method of obtaining the IP address of the terminal device, the DHCP is used. The MAC address is a known address which is set in the factory and held by the network card of the terminal device.

More specifically, the terminal device must issue an inquiry in order to obtain its IP address and the MAC address of the transfer destination. The current IP network always performs connection in any one of the data link layer (Ethernet), network layer (IP layer), and transport layer (TCP/UDP layer). In other words, terminal devices can be basically connected, and a security function of determining whether their connection is permitted depends on password management by an application on the session layer or upper layer.

The subnet communication method (layer 2 communication) after acquiring the IP address of the terminal device and the MAC address of the transfer destination is as follows. Within the subnet, communication connection is done using only the MAC address. When the layer 2 communication method based on the MAC address is defined as a LAN communication method, details of the LAN communication method within the subnet are as follows.

This communication method will be explained by exemplifying communication between device A connected to port "1" of a LAN switch (switching hub) and device B connected to port "5", as shown in FIG. 21.

Assume that device A is to communicate with device B.
1. Device A sets its MAC address MAC-A, its IP address IP-A, MAC address MAC-B of the partner device, and IP address IP-B of the partner device in an Ether frame to generate and transmit transmission frame FR-A.
2. The LAN switch reads originating MAC address MAC-A from input frame FR-A from port 1, and registers MAC address MAC-A in a MAC address table ensured in the apparatus. The MAC address table holds the correspondence between the port number (in this case, port "1") and MAC address MAC-A.
3. The switch does not have the MAC address of destination device B in the MAC address table at first, and broadcasts (or floods) the input packet to all associated ports.
4. When the destination MAC of received frame FR-A coincides with MAC address MAC-B of device B, destination device B which has received broadcasted frame FR-A sets its MAC address MAC-B, its IP address IP-B, MAC address MAC-A of the partner device, and IP address IP-A of the partner device in Ether frame FR-B, and sends back Ether frame FR-B.
5. In FIG. 21, since device B is connected to port "5" of the LAN switch, the LAN switch receives Ether frame FR-B via port "5". The LAN switch reads MAC address MAC-B of the transmission source (in this case, the network interface card of device B), and registers MAC address MAC-B in the MAC address table. The MAC address table holds the correspondence between port 5 and MAC address MAC-B.

Subsequent communication between device A and device B is one-to-one communication without flooding because the addresses of the two terminal devices have been registered in the MAC address table of the switch. Communication between the two devices does not influence other ports.

After a series of communication operations end and when a predetermined time (e.g., 5 min) has elapsed, the correspondence "port and originating MAC address" registered in the MAC address table within the LAN switch is deleted.

In this LAN communication,
1. The MAC address and IP address of a transmission device leak due to flooding.
2. This method always permits communication connection between devices, and authentication of access to a partner device depends on password check on the session stage.

For this reason, a MAC address and IP address can be acquired on the basis of a broadcasted flooding packet. By generating a frame having a disguise MAC address and IP address, up to communication connection on the transport layer can be achieved. Access management depends on only password authentication management on the session layer.

Since the MAC address (set in the manufacture) and IP address (set by the DHCP) are given values which cannot be changed by the user, leakage cannot be prevented by any measure such as a periodic change of the MAC address and IP address. Also, the password is very weak in the company and can be easily broken by analogy, as described above.

In this manner, the conventional method can construct a specific group area network within the LAN, but cannot construct a securely separated specific group area network.

The following problem also occurs in the implementation of a private area network by image terminal devices of a specific group.

In LAN communication, transaction type burst (or bulk) data of a general LAN terminal device (personal computer) and stream type successive data of an image terminal device are similarly divided into Ethernet packets and then transmitted. Stream type data requires isochronism in regard to the time, but an attribute which can be added to packet data is only priority in the packet process queue. For example, when a burst jumbo packet pertaining to burst data is being transferred, transmission of even a stream packet with the highest priority must wait for the end of the transfer process.

In this manner, a burst packet and stream packet are transmitted by the same process and controlled by only the process order priority. A stream packet from an image terminal device is obstructed by a burst packet from a general LAN terminal device, and cannot be supplied at a necessary timing.

These problems can be easily understood from the assumption that a network monitor directly connectable to the LAN is developed and the isochronous stream of uncompressed image data is transmitted via the LAN and displayed on the network monitor.

That is, the current LAN suffers contention between stream data and general burst data of a personal computer on the LAN. In this case, stream data must be permitted to pass even by interrupting general burst data during processing.

As described above, the conventional LAN cannot preferentially process stream data.

SUMMARY OF THE INVENTION

It is an object of the present invention to implement a secure specific group area network which is configured by only specific terminal devices within the LAN.

For this purpose, the present invention proposes a new communication method which is different from the conventional LAN communication method and is used for communication between specific terminal devices. The LAN method is used for communication in the general LAN, whereas the new communication technique is used in the specific group.

The new communication technique has the following requirements.

First, communication does not leak address information such as the MAC address or IP address. That is, a technique which does not require flooding is provided.

Second, communication connection between unnecessary terminal devices is basically inhibited, and security on a layer lower than the session stage is ensured. That is, unwanted terminal devices cannot be connected (no data link).

Third, the frame format of the Ethernet (IEEE 802.3) is maintained, and compatibility and coexistence with existing LAN communication are achieved.

It is another object of the present invention to provide a configuration/means for implementing a private area network within the LAN with the following features on the basis of the new communication method.
1. A terminal device in a specific group must be accessible to a company information terminal device within the LAN.
2. An outsider terminal device within the LAN must not be accessible to a terminal device in a specific group.
3. Terminal devices in different specific groups must not be accessible.

Connection switches and specific terminal devices require a configuration which copes with both communication means for the LAN and communication means in the specific group.

More specifically, the configuration/means provided by the present invention is implemented in the form of a connection switch, server, and terminal device. These devices cooperate with each other to reflect the configuration/means of the present invention.

In this fashion, the present invention implements a private area network within the LAN that is configured by terminal devices (PCs and the like) used by specific members.

In other words, the present invention provides a method of separating the channel of the data traffic within a specific group from that of the general LAN traffic for the purpose of security.

At this time, a mechanism of preventing erroneous transfer of a data packet between different specific groups due to a communication error or the like is also necessary.

The present invention further provides means for performing communication between terminal devices of a specific group preferentially to LAN communication.

As for streaming communication between terminal devices of a specific group, the present invention provides means for performing an absolute priority process over general burst communication. Data steaming in a private area network within the LAN is implemented.

In this case, a control mechanism upon congestion between streaming signals is required.

To achieve the above objects, for example, a network switching apparatus according to the present invention has the following arrangement.

More specifically, a switching apparatus having a plurality of connection ports for connecting a plurality of terminal devices to a network, comprising:

label information storage means for storing information indicative connection between ports for transmitting information, as routing label information; and port connection control means for detecting label information contained in data when the data is received from one of the plurality of ports, acquiring routing label information corresponding to the detected label information from the label information storage means, and connecting corresponding ports in accordance with the acquired routing label information.

A network is configured by connecting one or a plurality of switching apparatuses having this arrangement. This network can suppress leakage of information even if a device which communicates by using general address information is connected.

A preferred aspect of the present invention discloses, as a new communication method in the LAN, a communication technique of performing switching operation using a full-routing label.

Communication using the full-routing label will be called PAN (Private Area Network) communication hereinafter.

The PAN communication method is implemented by cooperating route management server means, a plurality of connection switching means, and a plurality of terminal device means.

The PAN communication method comprises
the first session associated with route management in which a full-routing label is created and distributed, and
the second session associated with communication in which data is transmitted by using the full-routing label.

In correspondence with these sessions, the route management server comprises means for performing the first route management session and means for performing the second communication session.

The first route management session means comprises the first step of creating a full-routing label between connection switches, the second step of creating a full-routing label between terminal devices, the third step of creating a routing label table which lists the relationship between all full-routing labels, terminal devices, and connection switches, the fourth step of creating a label switch table from the routing label table and distributing the label switch table to each connection switch, and the fifth step of creating a destination label table from the routing label table and distributing the destination label table to each terminal device.

In the first step, each constituent device has the following constituent means or step.

The route management server comprises means for performing LAN communication, means for assigning full-routing labels to connection switches sequentially from a connection switch connected to the route management server, and means for communicating with the connection switches on the basis of the assigned full-routing labels.

Each connection switch comprises means for performing LAN communication, means for detecting another connection switch connected to the connection switch, and means for performing PAN communication with the route management server on the basis of the assigned full-routing label.

The full-routing label assigned by the route management server is different between routes, and the same label is not assigned to different routes.

In the second step, the route management server comprises means for instructing the connection switch by PAN communication to obtain connection information of connected terminal devices.

The connection switch comprises means for communicating with a connected terminal device by LAN communication and obtaining predetermined setting information, and means for notifying the route management server by PAN communication of the obtained connection information of the terminal device.

The terminal device comprises means for providing predetermined setting information by LAN communication to a connection switch connected to the terminal device.

The route management server comprises means for assigning a full-routing label to a terminal device on the basis of connection information of the terminal device to a connection switch, and means for notifying the connection switch by PAN communication of the full-routing label.

The connection switch comprises means for notifying the terminal device by LAN communication of the full-routing label.

The terminal device comprises means for performing PAN communication using the assigned full-routing label.

In the third step, the route management server comprises means for creating a routing label table which lists the relationship between all full-routing labels, terminal devices, and connection switches.

In the fourth step, the route management server comprises means for creating a label switch table for each connection switch from the routing label table, and means for exclusively distributing the label switch table of the connection switch to only a corresponding connection switch by the PAN communication.

In the fifth step, the route management server comprises means for creating a destination label table for each terminal device from the routing label table, and means for exclusively distributing the destination label table to only a corresponding terminal device by the PAN communication.

The second communication session is formed by the first state associated with communication setting in which whether PAN communication using the routing label is possible is confirmed and prepared, the second state in which actual communication operation using the routing label is performed, and the third state associated with the end of communication in which actual communication using the routing label ends.

In the first communication setting state, each constituent device has the following constituent means.

The terminal device comprises means for transmitting to a connection switch a communication request packet containing an identifier representing PAN communication, an identifier for identifying a specific group, and a routing label corresponding to a destination terminal device.

The connection switch comprises means for notifying the terminal device of communication permission under predetermined conditions.

In the second communication operation state, an originating terminal device comprises means for transmitting to a predetermined destination terminal device upon reception of the transmission permission response, a data packet containing an identifier representing PAN communication, an identifier for identifying a specific group, and a full-routing label within a predetermined specific group.

Each connection switch comprises means for outputting a packet to a predetermined output port on the basis of a predetermined routing label and transmitting the packet to the destination terminal device.

In the third communication end state, the originating terminal device comprises means for transmitting a transmission end packet containing an identifier representing PAN communication, an identifier for identifying a specific group, and a routing label corresponding to the destination terminal device during communication. The connection switch performs a communication end process.

In order to achieve cost reduction by reduction of an internal memory resource (holding a label table), the connection switch according to the present invention incorporates only small-scale cache memory means, and has means which is received from the route management server, as needed.

The route management server comprises flag means representing whether a corresponding label has been cached in a corresponding connection switch in a routing label table managed by the route management server, and means for, in confirming a destination label in the communication setting state, confirming the caching/non-caching flag, and when no label is cached, transmitting a corresponding routing label to the cache of the corresponding connection switch.

In the connection switch compatible to both PAN communication and LAN communication according to the present invention, erroneous switch control by a destination label communication error in the communication operation state is prevented, and the delay time in switch control is minimized. For these purposes, the frame format of communication data is formed by the first field containing the first identifier representing communication with a specific group, the second field containing the second identifier for identifying a specific group, the third field containing the third identifier for designating all switching routes from originating terminal devices to destination terminal devices within a predetermined specific group, and the fourth field containing a CRC error check function to the first, second, and third identifiers.

For a data packet having this structure, the connection switch comprises means for reading the first, second, third, and fourth fields in the data packet received at a predetermined port, means for confirming, on the basis of CRC information of the fourth field, whether no transmission error exists in pieces of first, second, and third field information, and means for determining PAN communication with a specific group on the basis of the first identifier of the first field when no error exists, performing a determination process of determining, on the basis of the second identifier of the second field, which of specific groups includes the connection switch, selecting a routing label table corresponding to the specific group on the basis of determination, and performing a predetermined switching process to a destination terminal device within the specific group in accordance with the selected routing label table on the basis of the third identifier of the third field.

The connection switch also comprises means for activating a retransmission process upon detection of a transmission error.

The series of operations of the connection switch are generally implemented by hardware means.

The connection switch is also characterized by selecting a corresponding table from a plurality of conversion tables (routing label tables) corresponding to a plurality of specific groups on the basis of the second identifier, and performing switch control using the third identifier on the basis of the selected table.

In order to realize compatibility with both PAN communication and LAN communication, the connection switch according to the present invention comprises the first switch control means associated with the LAN method, the second switch control means associated with the PAN method, and means for switching the first and second switching methods in accordance with a predetermined identifier.

The connection switch according to the present invention is further characterized by comprising means for, when a PAN packet from a specific group and a LAN packet from a local area network congest at the same output port of the connection switch, giving priority to a process of a data packet from the specific group on the basis of the first identifier representing communication with the specific group. In this case, even if a LAN packet is first processed, a subsequent PAN packet is preferentially processed.

Moreover, the connection switch comprises means for, when an isochronous PAN packet and general PAN packet congest at the same output port of the connection switch, preferentially processing the packet having isochronism identification information on the basis of an identifier representing the type of PAN packet. In this case, the connection switch comprises means for, even if a general PAN packet is first processed, processing a subsequent isochronous PAN packet with an absolute priority.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A and 5B are tables showing an example of the connection routing tables of all devices that are created by a PAN server;

FIGS. 7A and 7B are tables showing an example of a routing label table distributed by the PAN server to each terminal device;

FIGS. 8A and 8B are tables showing an example of a routing label table distributed by the PAN server to each connection switch;

FIGS. 11A and 11B are tables showing the routing label table of each PAN;

FIG. 16 is a view showing the states of the communication session;

FIG. 23 is a view showing the frame format of an MPLS;

DETAILED DESCRIPTION OF THE PREFERRED EMBODIMENT

A preferred embodiment of the present invention will be described in detail below with reference to the accompanying drawings.

A communication method according to the embodiment will be explained.

This communication method is based on the principle of a label switch. The label switch is originally adopted as an MPLS (Multi Protocol Label Switch: standardized by IETF) in the trunk router of the Internet.

Figure 22:
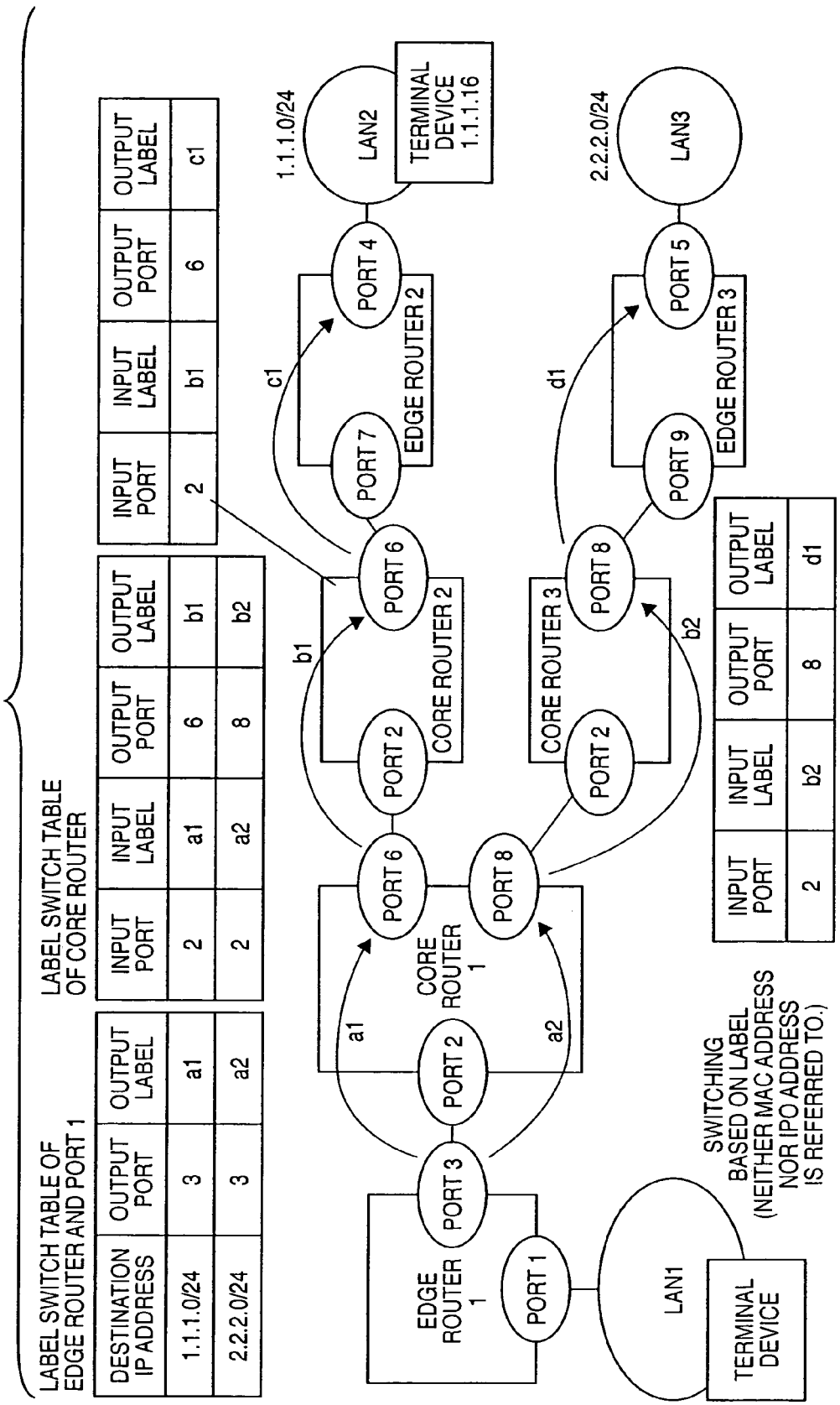
FIG. 22 is a view showing the mechanism of a label switch.

As the principle of the label switch, as shown in FIG. 22, a label is assigned to a route from a predetermined input port to predetermined output port of a switch. By referring to the label, a received data packet is sent to the predetermined output port without referring to any address (MAC address and IP address).

In the example of FIG. 22, edge routers 1, 2, and 3 and core routers 1, 2, and 3 configure a trunk network using the MPLS.

Assume that a terminal device within LAN 1 connected to port 1 of edge router 1 transmits a data packet to a terminal device at an IP address 1.1.1.16 that belongs to a forwarding equivalent class (FEC) 1.1.1.0/24 present in LAN 2. At this time, edge router 1 inserts label a1 into a data packet, and sends the data packet to port 3.

Core router 1 which has received the data packet refers to label a1, and outputs the data packet to port 6. At this time, the label is replaced (swapped) from a1 to b1. Core router 2 refers to label b1, converts the label from b1 to c1, and outputs the data packet to port 6. Edge router 2 refers to label c1, and outputs the data packet to port 4 connected to LAN 2. In output, the label is removed.

In general, the label is so assigned as to close within each router, and is swapped between routers. There is also a proposal for a global label which does not require any swapping between routers.

The MPLS groups transfer data packets in accordance with the FEC of layer 3, and assigns the same label to the data packet group corresponding to the FEC.

Forwarding of layer 2 by the trunk router is performed by referring to only the label.

The MPLS has a frame format as shown in FIG. 23.

As shown in FIG. 23, a switch label is inserted after the MAC address and Ether type field.

The embodiment proposes a new communication method used within the local area network (LAN) of layer 2 on the basis of the label switch principle. By the new communication method, a specific group area network (Private Area Network: to be simply referred to as PAN hereinafter) is configured within the LAN.

More specifically, the PAN communication method is adopted as the second switching method in addition to address communication in a conventional LAN (to be referred to as a LAN communication method hereinafter), and the specific group area network PAN is configured within the LAN. Further, the embodiment makes various proposals for a "connection switch of layer 2" which copes with both the LAN method and PAN method and implements construction of the PAN within the LAN.

The PAN communication mechanism according to the embodiment will be described in detail.

The PAN communication method is formed by a management session for configuring and maintaining the PAN and a communication session of performing PAN communication.

Figure 1:
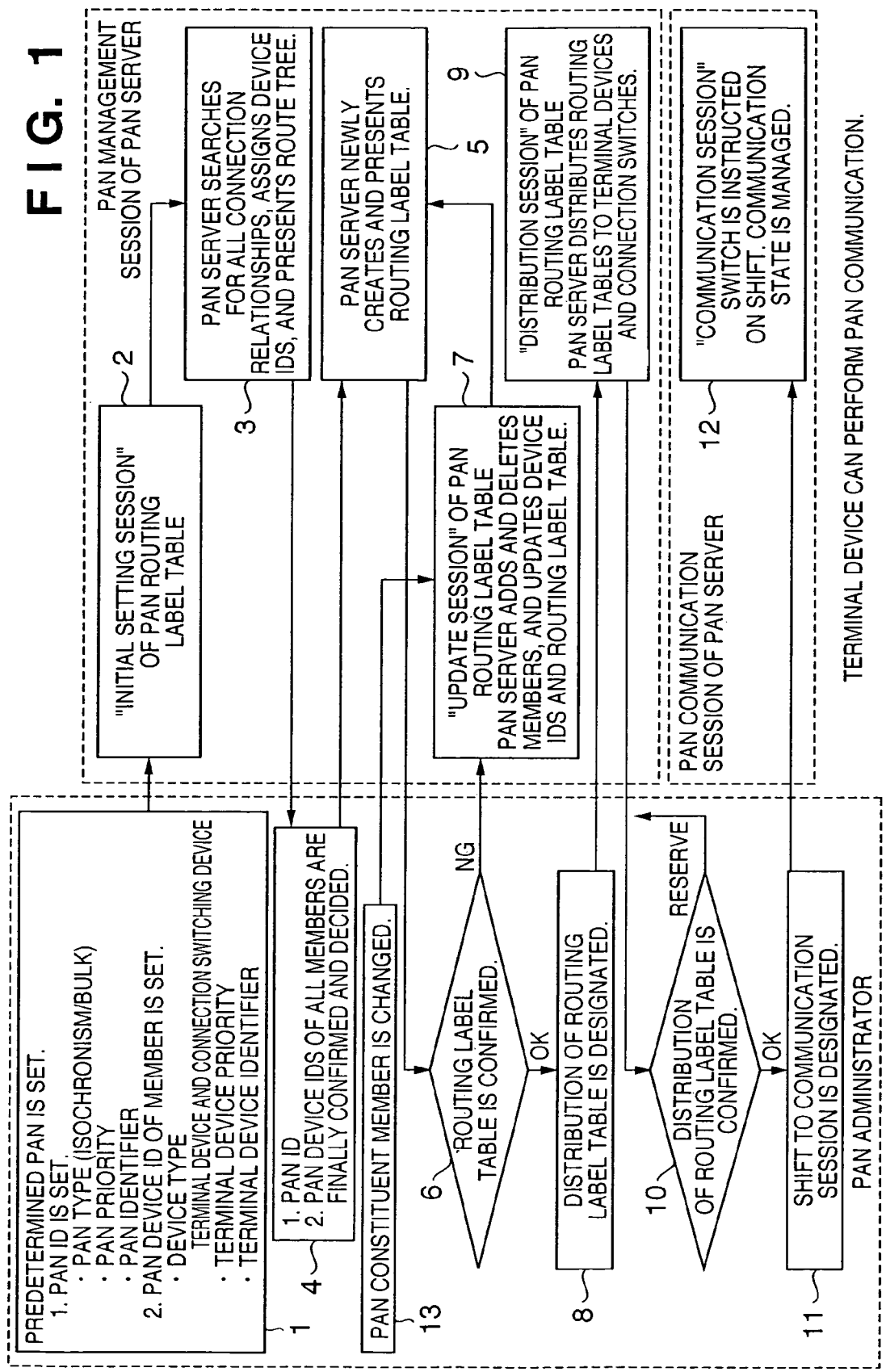
FIG. 1 is a view for explaining a PAN communication sequence in an embodiment.

That is, the PAN communication method is formed by a management session in which a PAN communicable environment is set and managed, and a communication session in which PAN communication is actually done between terminal devices. FIG. 1 shows the relationship between these sessions. Details of each session will be explained with reference to FIG. 1.

The management session is a phase which constructs the PAN. More specifically, the management session starts when a manager in an office which requires construction of the PAN installs "PAN-compatible connection switch"

"PAN server"

"PAN-compatible communication I/F adaptors" for all members who participate in the PAN, and after the end of predetermined physical connection, PAN setting is done in the PAN server.

The PAN-compatible communication I/F adaptor can take any form such as an internal card which is mounted into the PCI bus slot of a personal computer or an external adaptor which is connected to a USB interface.

A process which must be executed first by the manager, i.e., PAN administrator is a PAN initial setting session in the PAN management session. The PAN administrator activates a setting application functioning as a PAN server in the PAN server, and starts the PAN initial setting session. The user I/F of the initial setting session that is provided by the PAN server is used to set the PAN, i.e., a predetermined PAN ID and the PAN device IDs of all members (step 1 in FIG. 1).

The PAN ID is formed by

PAN type

PAN priority

PAN identifier

The PAN type includes an ISO PAN which performs isochronous transmission, and a bulk PAN which processes confidential data but does not require isochronism. One of these PAN types is selected (the ISO PAN is higher in priority than the bulk PAN).

The PAN priority designates the priority process order when a plurality of PANs of the same type exist. The PAN identifier sets a unique number (the PAN server generates a predetermined warning so as not to contend with another PAN identifier).

Figures 24A, 24B:
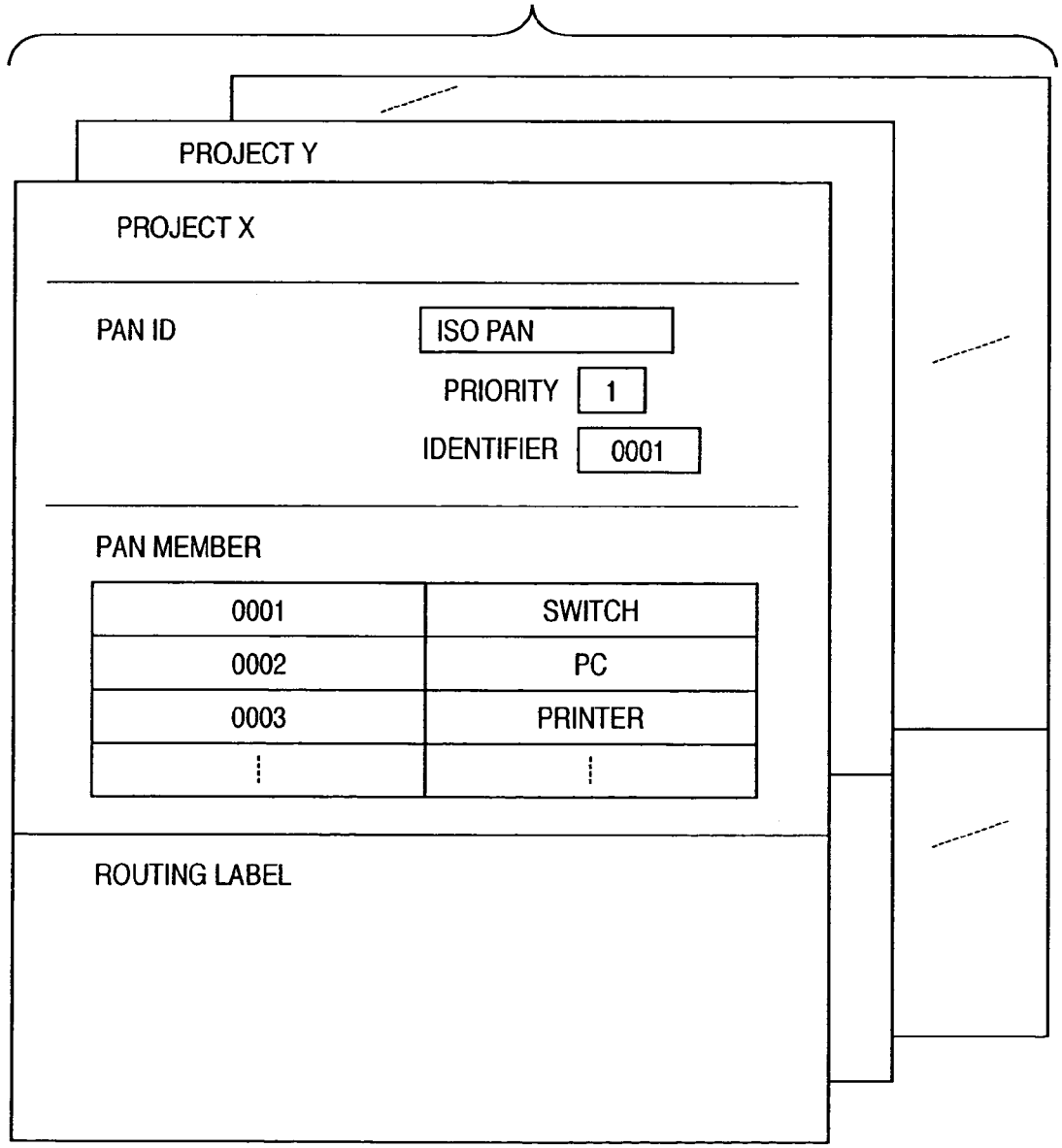
FIGS. 24A and 24B are views showing an example of a PAN registration window in the PAN server and stored/managed PAN data in the embodiment.

FIG. 24A shows a window displayed when a PAN ID setting program is activated in the PAN server. One PAN server can set and register a plurality of PANs instead of setting only one PAN. In FIG. 24A, the "PAN name" is a name which facilitates identification of a plurality of PANs when the administrator of the PAN server sets a plurality of PANs. The "PAN type" includes the two types, i.e., ISO PAN and bulk PAN in the embodiment, as described above, and is displayed with radio buttons for selecting either type. The "PAN priority" represents a higher priority for a smaller number. The "PAN identifier" is identification information for uniquely specifying a PAN set in the LAN.

As described above, a plurality of PAN IDs can be registered in one PAN server. When only one PAN ID is registered, the "PAN priority" is kept unchanged regardless of the input value. When "project X" is registered as a PAN name and the "PAN priority" upon setting another PAN (its name is "project Y") coincides with the previously set PAN priority, as shown in FIG. 24B, priority is given to the setting of the temporally latest project Y, and the priority of the previously set project (in this case, project X) is updated to a priority lower by one.

The ID of a PAN device (device such as a switch, PC, printer, or scanner belonging to the PAN) is formed by device type terminal device priority terminal device identifier The device type describes whether the device is a connection switch or terminal device, and for a terminal device, whether the terminal device is a printer, camera, or the like. Even data of the same isochronism can represent the priority of isochronism.

The terminal device priority represents the priorities of devices of the same type. The terminal device identifier sets a unique number (the PAN server generates a predetermined warning so as not to contend with another terminal device identifier within the same PAN).

The PAN ID and PAN device ID form a PAN member ID. This means that PAN members belong to different PANs even with the same PAN device ID as far as PAN IDs are different. The PAN device ID is uniquely defined. In short, when PAN IDs are different even with the same PAN device ID, PAN members are different.

As shown in FIG. 24A, a PAN ID is set and registered in the PAN server, and then a member belonging to the PAN ID is registered. The member is registered by setting a MAC address unique to each device (or network adaptor) belonging to the PAN ID (no user interface is illustrated). This suppresses registration of an unintended device (terminal device) as a member.

A PAN communication sequence will be explained with reference to FIG. 1.

After PAN setting ends in the above way, the PAN administrator issues a predetermined instruction to the PAN server, and the PAN server (route management server) executes the initial setting session (step 2).

In the "initial setting session", the PAN server assigns all devices (connection switches and terminal devices having PAN I/F adaptors) predetermined PAN device IDs which have already been set. The PAN server creates the connection tree of terminal devices for the PAN device IDs, presents the connection tree to the PAN administrator, and asks the PAN administrator to confirm it (step 3).

The PAN administrator confirms and decides the connection tree of terminal devices for the PAN device IDs, and issues a predetermined instruction to the PAN server (step 4).

The PAN server assigns labels to all routes from terminal devices to terminal devices on the basis of the instruction, creates a routing label table, and presents the routing label table to the PAN administrator (step 5).

The PAN administrator gives approval of whether the PAN configuration is OK (step 6).

If the PAN configuration is OK, the PAN administrator issues a routing label table distribution instruction to the PAN server (step 8).

Based on the instruction, the PAN server shifts to a "distribution session" in which the routing label table is distributed to connection switches and terminal devices (step 9).

Upon the completion of distributing the routing label table, the PAN server notifies the PAN administrator of the completion of distributing the routing label table. The PAN administrator determines whether to shift to the communication session (step 10).

If OK, the PAN administrator issues a communication session shift instruction to the PAN server (step 11).

The PAN server shifts to the "communication session" on the basis of the instruction, and notifies a predetermined connection switch of the start of the communication session (step 12).

If the routing label table is different from a desired configuration in step 6, or a PAN member is changed or added later (step 13), and the routing label table must be updated, the PAN administrator activates an "update session", and instructs the PAN server to reconfigure the routing label table (step 7).

As a result, information which controls members belonging to the PAN is formed for the set/registered PAN ID in the PAN server, as shown in FIG. 24B. Information in FIG. 24B is stored and held in a storage device such as the hard disk of the PAN server. As shown in FIG. 24B, PAN members are assigned with terminal device identifiers unique to devices such as a switch, PC (Personal Computer), and printer belonging to the PAN ID in the embodiment. Data of routing labels (full-routing label table) shown in FIG. 24B will be described later.

Figure 2:
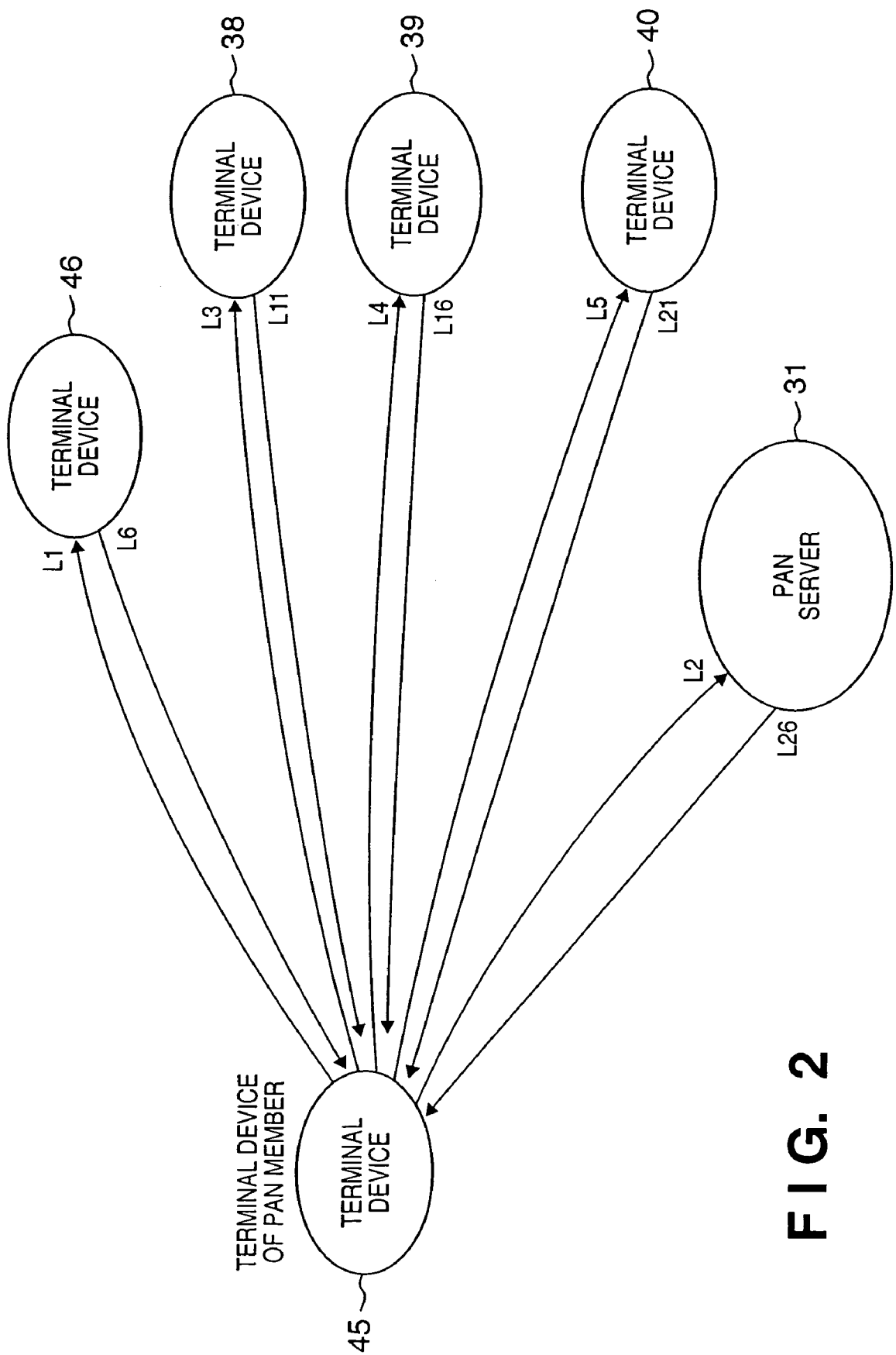
FIG. 2 is a view showing a full-routing label in PAN communication.

By the operation of the above-described PAN management session, full-routing labels are assigned to all routes between terminal devices, as shown in FIG. 2. The labels allow transmission of packet data. In the communication session, terminal devices can perform data communication between them by using predetermined labels.

The operation of the "initial setting session" in which a label table for designating all routes is created will be explained in detail.

Figure 3:
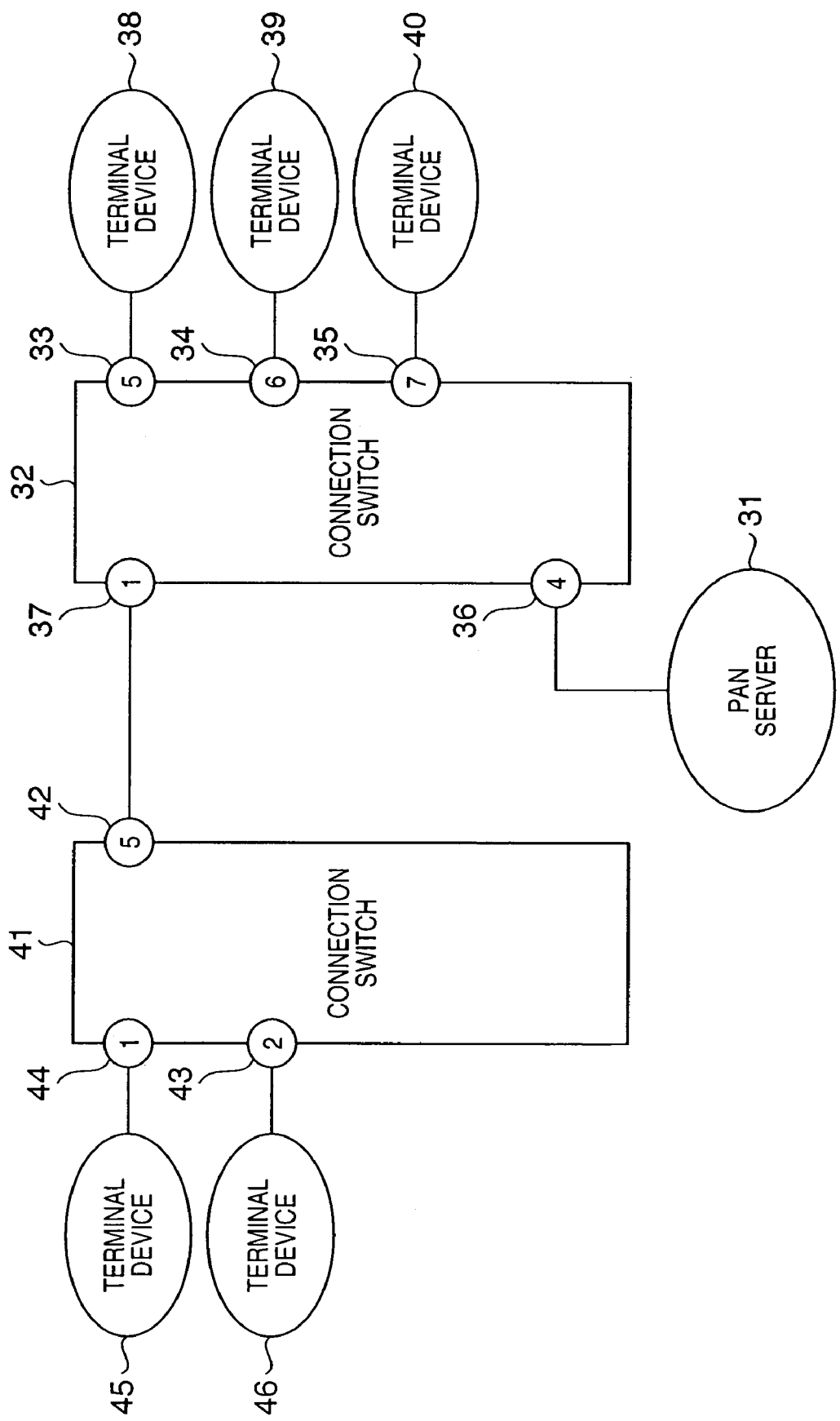
FIG. 3 is a view showing an example of connection for explaining full-routing connection.

FIG. 3 is a view showing an example of connection for explaining full-routing connection. In this example, the PAN is configured by two connection switches, five terminal devices, and one PAN server.

In FIG. 3, reference numeral 31 denotes a PAN server (route management server); and 32, a connection switch. Reference numerals 33, 34, 35, 36, and 37 denote ports of the connection switch 32. Reference numerals 38, 39, and 40 denote terminal devices connected to the connection switch 32. Reference numeral 41 denotes a connection switch; and 42, 43, and 44, ports of the connection switch 41. Reference numerals 45 and 46 denote terminal devices connected to the connection switch 41. In this case, the PAN server 31, the terminals 38 to 40, 45, and 46, and the connection switches 32 and 41 are devices belonging to one PAN ID.

As will be explained to avoid misunderstanding, the PAN server according to the embodiment is a server for managing the route. A general file server, print server, and database server may be any of the terminal devices 38 to 40, 45, and 46 shown in FIG. 3, or these server functions may be provided by the PAN server.

The connection switches 32 and 41 in FIG. 3 cope with full-routing communication, i.e., PAN communication, and execute the following operation in cooperation with the PAN server 31.

Figure 4:
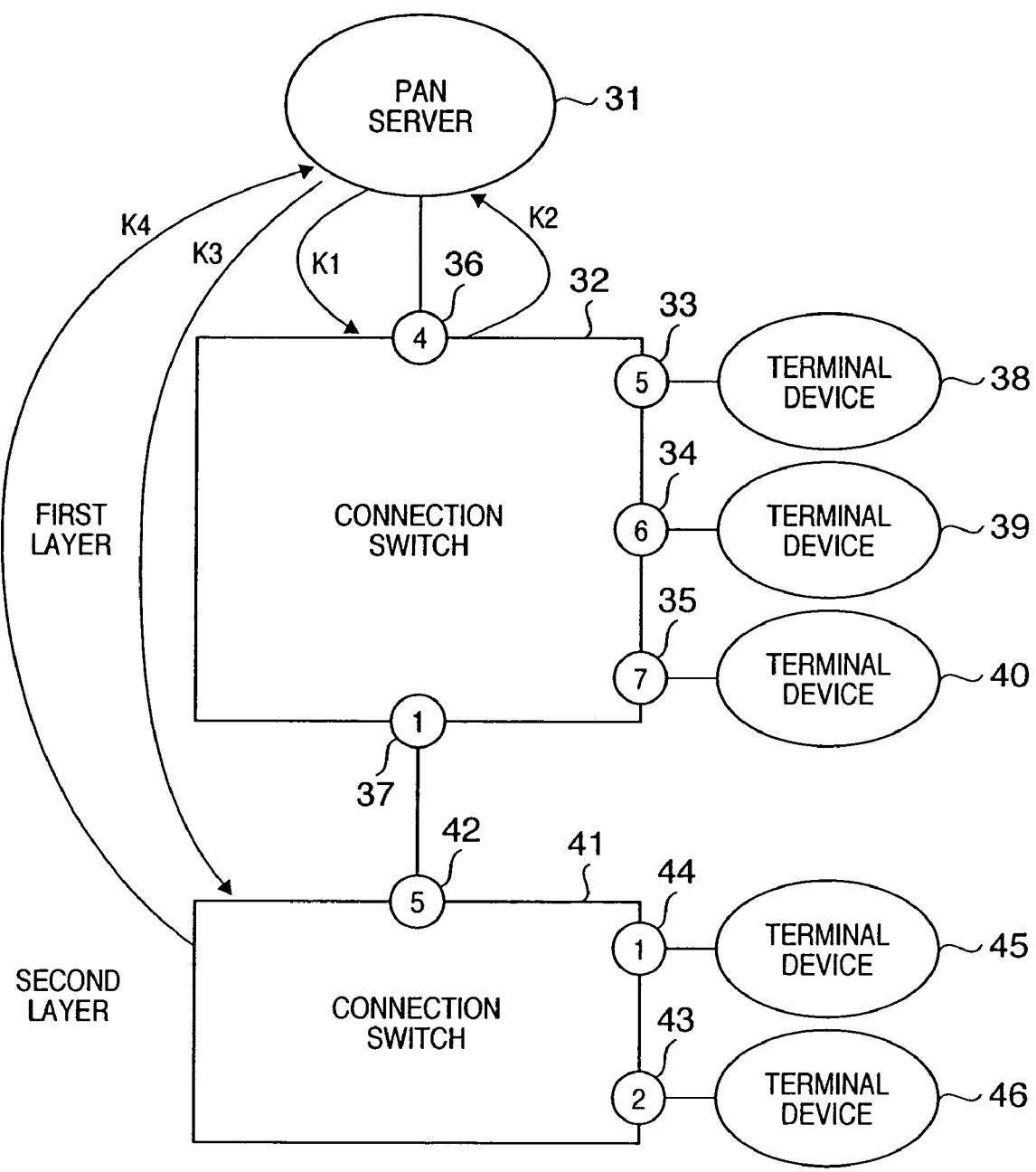
FIG. 4 is a view for explaining operation of creating a tree of all routes.

For easy understanding, FIG. 4 illustrates the configuration in FIG. 3 that is rewritten by centering the PAN server 31. A PAN construction process will be explained below.

1. In FIG. 3, the PAN server 31 communicates with the connection switch 32 directly connected to the PAN server 31 by existing LAN communication, and assigns the connection switch 32 predetermined management labels K1 and K2 for communication with the PAN server 31. K1 is a label used for communication from the PAN server 31 to the connection switch 32, and K2 is a label used for communication from the connection switch 32 to the PAN server 31. Transmission and reception are different in only direction, and the values of K1 and K2 can be the same but are preferably different for higher security.

It should be noted that when the connection switch 32 (also the connection switch 41) in the embodiment receives a route setting request, it assumes that the PAN server which controls the PAN ID exists on the extension of a port number (information which specifies a port) at which the request has been received, and stores and saves the port number in a predetermined storage device so as to discriminate the connection switch 32 from other PAN members belonging to the PAN ID.

Subsequent communication between the PAN server 31 and the connection switch 32 can comply with the PAN communication method. PAN communication is routing communication, unlike LAN communication, and does not flood communication data under any condition.

2. The PAN server 31 requests the connection switch 32 to search for PAN member terminal devices by PAN communication (PAN Enum).

3. The connection switch 32 searches for terminal devices of the first layer directly connected to the connection switch 32 (terminal devices connected to the first connection switch) by LAN communication (detects devices by using a general MAC address and IP address), and lists only the terminal devices of predetermined PAN members (including port number information). The connection switch 32 also lists the connection switch 41 of the second layer connected to the connection switch 32. The connection switch 32 notifies the PAN server 31 by PAN communication of the list (including MAC address information of connected devices) of PAN member terminal devices of the first layer directly connected to the connection switch 32, and the list of the connection switch of the second layer.

4. By LAN communication, the PAN server 31 can obtain the MAC addresses of devices of the first layer directly connected to the connection switch 32. The connection switch 32 checks the MAC addresses (as described above, the MAC addresses of devices belonging to the PAN ID are set), and determines whether each device should be registered in the PAN ID. For terminal devices determined to be registered, the connection switch 32 sets the PAN ID and PAN device IDs. The PAN server 31 assigns labels (two labels for transmission and reception) for communication with each terminal device, and sends the labels (only for communication with the PAN server) to the terminal device NIC (network adaptor). The PAN server 31 disables LAN communication. Thereafter, the terminal devices of the first layer and the PAN server can communicate with each other via the PAN.

5. The PAN server 31 temporarily enables LAN communication, communicates with the connection switch 41 of the second layer via the LAN, and assigns the connection switch 41 predetermined management labels K3 and K4 for communication with the PAN server 31. K3 is a label used for communication from the PAN server 31 to the connection switch 41, and K4 is a label used for communication from the connection switch 41 to the PAN server 31.
6. The PAN server disables LAN communication. Thereafter, the connection switch 41 of the second layer and the PAN server 31 can communicate with each other via the PAN.
7. The PAN server requests the connection switch 41 of the second layer to search for PAN member terminal devices of the second layer directly connected to the device (connection switch 41) by PAN communication.
8. The connection switch 41 of the second layer searches for terminal devices of the second layer directly connected to the connection switch 41 by LAN communication (detects devices by using a general MAC address and IP address), and lists only predetermined PAN member terminal devices. The connection switch 41 notifies the PAN server 31 by PAN communication of the list of PAN member terminal devices of the second layer directly connected to the connection switch 41.
9. By LAN communication, the PAN server 31 sets a predetermined PAN ID and PAN device IDs for the PAN member terminal devices of the second layer directly connected to the connection switch 41. The PAN server 31 assigns labels (two labels for transmission and reception) for communication with each terminal device, and sends the labels (only for communication with the PAN server) to the terminal device NIC. The PAN server 31 disables LAN communication. The PAN server 31 notifies the connection switches 32 and 41 of the routing label tables of terminal devices. Thereafter, the terminal devices of the second layer and the PAN server can communicate with each other via the PAN.
10. The same operation continues until all PAN members are confirmed.

Upon the completion of confirming all members, the PAN server 31 obtains information on the connection routes of connection switches (for example, information representing that the PAN server is connected to port "4" of the connection switch 32 and port "5" of the connection switch 41 is connected to port "1" of the connection switch 32), and information representing a connection switch and its port to which a member device belonging to the PAN ID is connected. The PAN server 31 generates the tree of all routes on the basis of these pieces of information.

An example of the connection routing table created by the above-described "initial setting session" is shown in FIGS. 5A and 5B. FIGS. 5A and 5B also show information "routing label" in FIG. 24B.

FIGS. 5A and 5B show assignment of routing labels L1 to L3 to all possible communication combinations between the PAN server 31 and all the terminal devices 38, 39, 40, 45, and 46 in FIG. 4.

Figure 6:
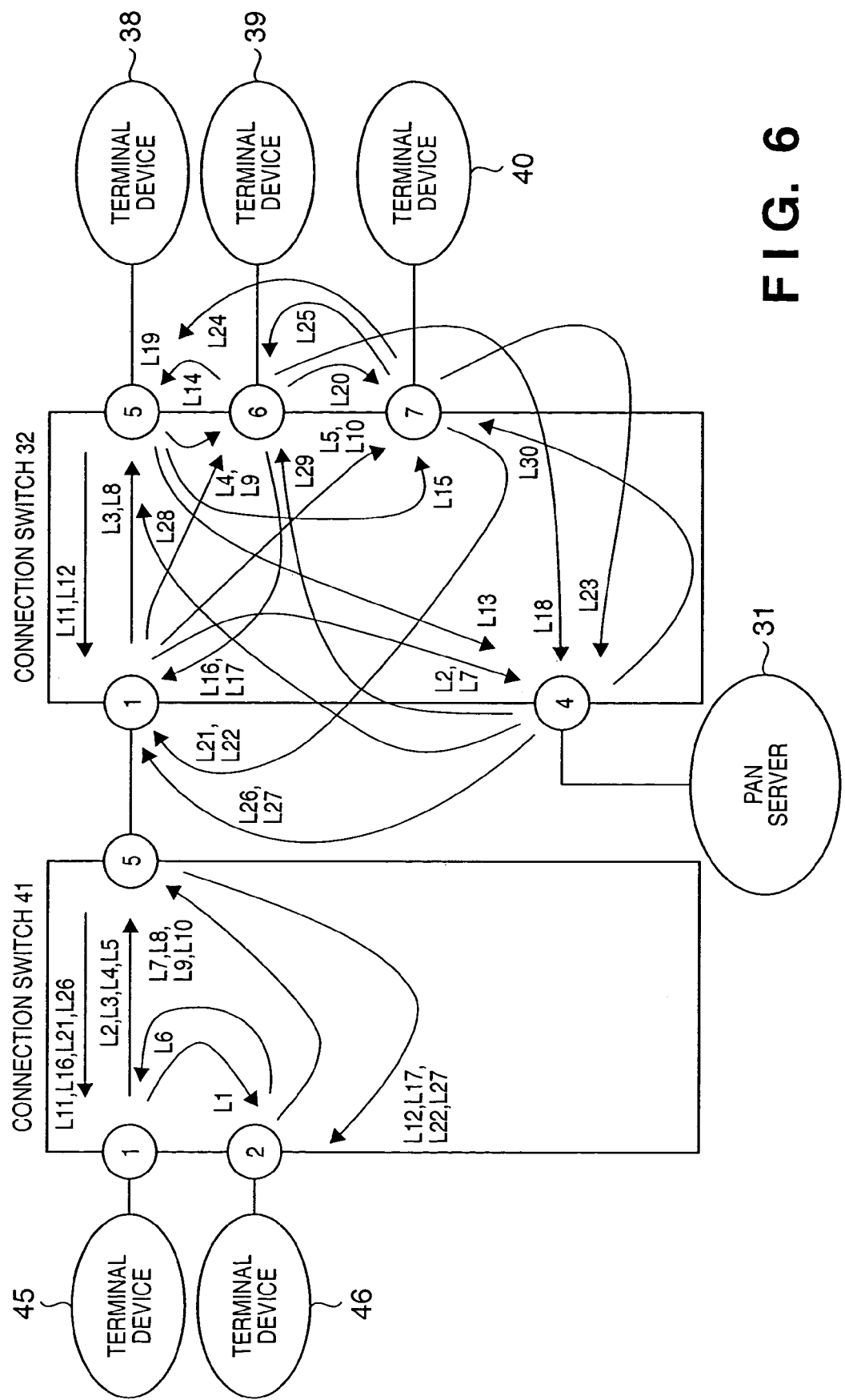
FIG. 6 is a view showing the relationship between the full-routing label and a terminal device.

FIG. 6 shows the connection routing table together with an actual connection diagram. Unique routing labels L1 to L30 are assigned between the PAN server and the terminal devices.

The "distribution session" (step 9 in FIG. 1) in which the routing label table is distributed to connection switches and terminal devices will be explained in more detail.

1. The PAN server 31 reports the entire connection routing tables of predetermined PAN member terminal devices to the PAN administrator (step 5 in FIG. 1). In response to this, the PAN administrator confirms the table, and gives final approval (step 6 in FIG. 1). The report form may be a routing table form as shown in FIGS. 5A and 5B or a form as shown in FIG. 6. In authentication, an authentication button (not shown) displayed on the display window is designated with a pointing device.

The PAN server 31 assigns, without omission, unique identification IDs to the "PAN-compatible communication I/F adaptors" (Network Interface Adaptors/Cards: to be simply referred to as NICs hereinafter) of all predetermined PAN member terminal devices which have been approved. Also, the PAN server 31 generates the routing label tables of all the terminals without omission. FIGS. 7A and 7B shows an example of the tables.

Each table in FIGS. 7A and 7B is a routing label table pertaining to only each terminal device, and does not include another routing label not pertaining to the terminal. Management and distribution of such exclusive label table further enhances security. The routing label tables of terminal devices have already been sent in the initial setting session by PAN communication using distributed labels between the PAN server 31 and the terminal devices.

2. The PAN server 31 distributes, to the PAN connection switches 32 and 41, routing label tables which define the switching method. FIGS. 8A and 8B show an example of the routing label tables of the connection switches. FIGS. 8A and 8B define the switching rule using the label between the input and output ports of each connection switch. The table includes only information on each connection switch without including information on another connection switch, and is exclusively managed. The routing label table of each connection switch is sent to the connection switch by PAN communication using management labels (K1 to K4).

The update session will be described in more detail by exemplifying addition of a new member.

A LAN member which is permitted by the PAN administrator and newly participates in the PAN installs a predetermined NIC and predetermined driver software in the terminal device of the LAN member. Subsequently, the LAN member executes the following operation. If the newly registered terminal device is not a PC or the like but a scanner, printer, or the like which is connectable to the PAN from the beginning, no software need be installed.

1. The PAN administrator adds and sets the PAN device ID of the new member. At this time, the PAN administrator also registers the MAC address of a device serving as the new member.
2. The terminal device as the new member activates a predetermined PAN NIC setting mode. At this time, a PAN identifier to which the terminal device is to belong is also input. The new terminal device transmits a registration request by LAN communication.

3. It can be easily understood that the device transmits a registration request by LAN communication because the device has not been recognized as a PAN member yet. The request is transmitted using the DHCP (BOOTP protocol) on a general LAN. When the connection switches 32 and 41 in the embodiment also have an existing LAN function, an IP acquisition request in the LAN and a PAN member registration request in the PAN must be discriminated. For this purpose, when a 2-byte frame type in a received frame is 0x0800 representing general IP communication, the connection switch in the embodiment broadcasts the request to the DHCP server because this request aims at IP acquisition. When the frame type is 0x8847 (representing an MPLS packet), the connection switch determines that the request is sent from a device to be registered as a PAN member. In this case, the connection switch specifies a PAN server which controls the PAN ID stored in the switch, on the basis of a PAN identifier in the received registration request. The connection switch outputs the request to a port connected to the PAN server by PAN communication. For this reason, each connection switch (switching apparatus) stores a port connected to the PAN server which controls each PAN identifier.
4. The PAN server receives this notification, and presents it to the PAN administrator via a predetermined user I/F. When an input instruction representing that the device is approved is received from the PAN administrator (for example, an authentication button on the user interface is pressed), or the device is determined to have a MAC address permitted to be newly registered, the PAN server sets the PAN ID and PAN device ID of the terminal device by LAN communication. The PAN server assigns the terminal device (also including a newly registered device) a routing label for the PAN server, and distributes the routing label by LAN communication. The PAN server then disables LAN communication.
5. The PAN server updates the routing label tables of all terminals including the new member terminal device, and sends only the routing label table between each terminal device and other terminal devices to each terminal device by PAN communication. The PAN server also sends the routing label table of only each PAN connection switch to the switch present on the route by PAN communication. Of these settings, only settings associated with the new terminal device are desirably notified to reduce the communication amount. Consequently, the new terminal device can be registered as a PAN member and can perform PAN communication.

A method of implementing within the LAN a plurality of PANs which can be generated by PAN communication using the routing label will be explained.

Figure 9:
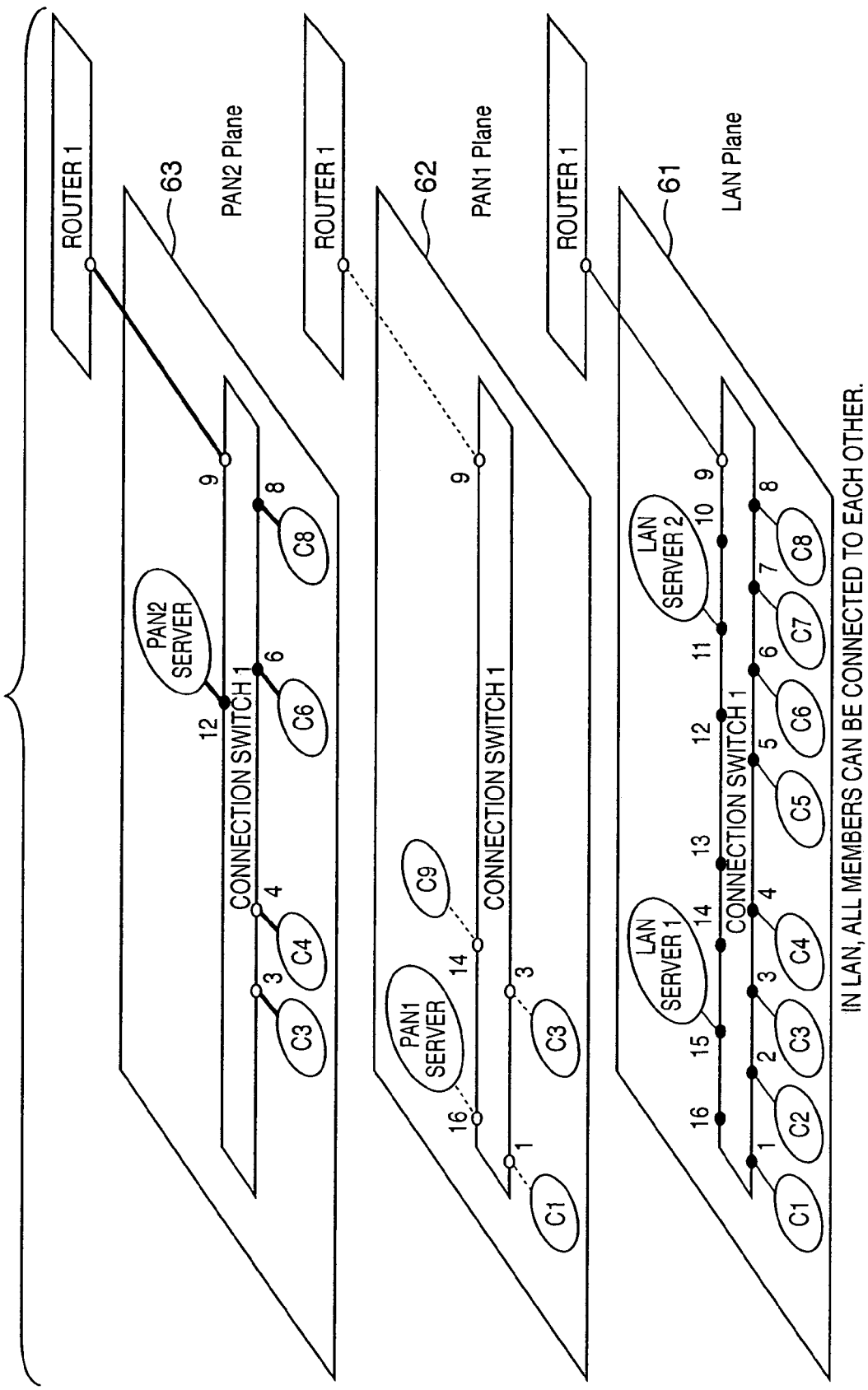
FIG. 9 is a view showing, as logically separate planes, two PANs configured within the LAN.

FIG. 9 is a conceptual view showing an example in which two PANs are configured within the LAN. In FIG. 9, reference numeral 61 denotes a LAN plane conceptually representing a LAN. The LAN includes PC terminal devices, connection devices, and server terminal devices such as eight client terminal devices (e.g., PCs) C1 to C8, VLAN-compatible connection switch 1, LAN server 1 for VLAN 1, LAN server 2 for VLAN 2, and VLAN-compatible router 1.

The VLAN means a virtual LAN. The VLAN divides a company LAN which tends to be big into virtually (not physically but logically) small partitions (for, e.g., respective departments), and limits the broadcasting (flooding) range. For example, for a LAN in which 10,000 people participate, broadcasting (flooding) targets 10,000 people unless the LAN is divided into VLANs. This is the reason of setting the VLAN.

In FIG. 9, reference numeral 62 denotes a plane conceptually representing the first PAN "PAN 1". PAN 1 includes three client terminal devices C1, C3, and C9, VPAN-compatible connection switch 1, PAN server 1 for PAN 1, and VPAN-compatible router 1.

In FIG. 9, reference numeral 63 denotes a plane conceptually representing the second PAN "PAN 2". PAN 2 includes four client terminal devices C3, C4, C6, and C8, VPAN-compatible connection switch 1, PAN server 2 for PAN 2, and VPAN-compatible router 1.

The VPAN means a virtual PAN, and represents that the PAN is virtually (not physically but logically) configured within the LAN.

Figure 10:
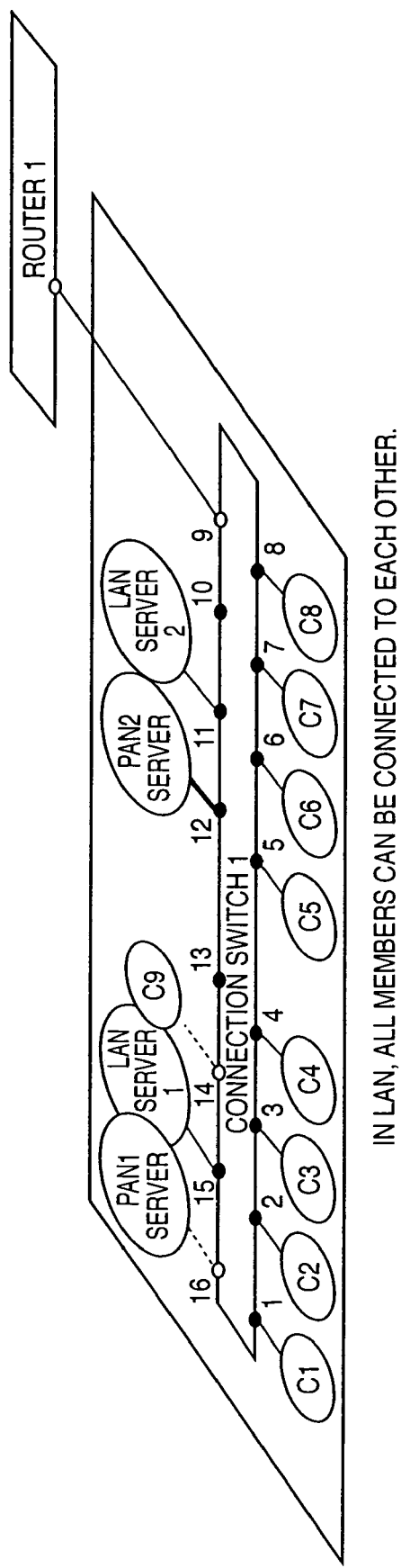
FIG. 10 is a view showing a physical connection relationship in FIG. 9.

FIG. 10 shows actual physical wiring in FIG. 9. That is, the PAN is configured as a VPAN within the LAN. As is apparent from FIG. 10, client terminal device C3 belongs to three planes: LAN plane, PAN 1 plane, and PAN 2 plane.

In FIG. 9, the LAN plane and PAN planes are separated from each other because their channels are separated. Channel separation is implemented by the following mechanism.

Figure 12:
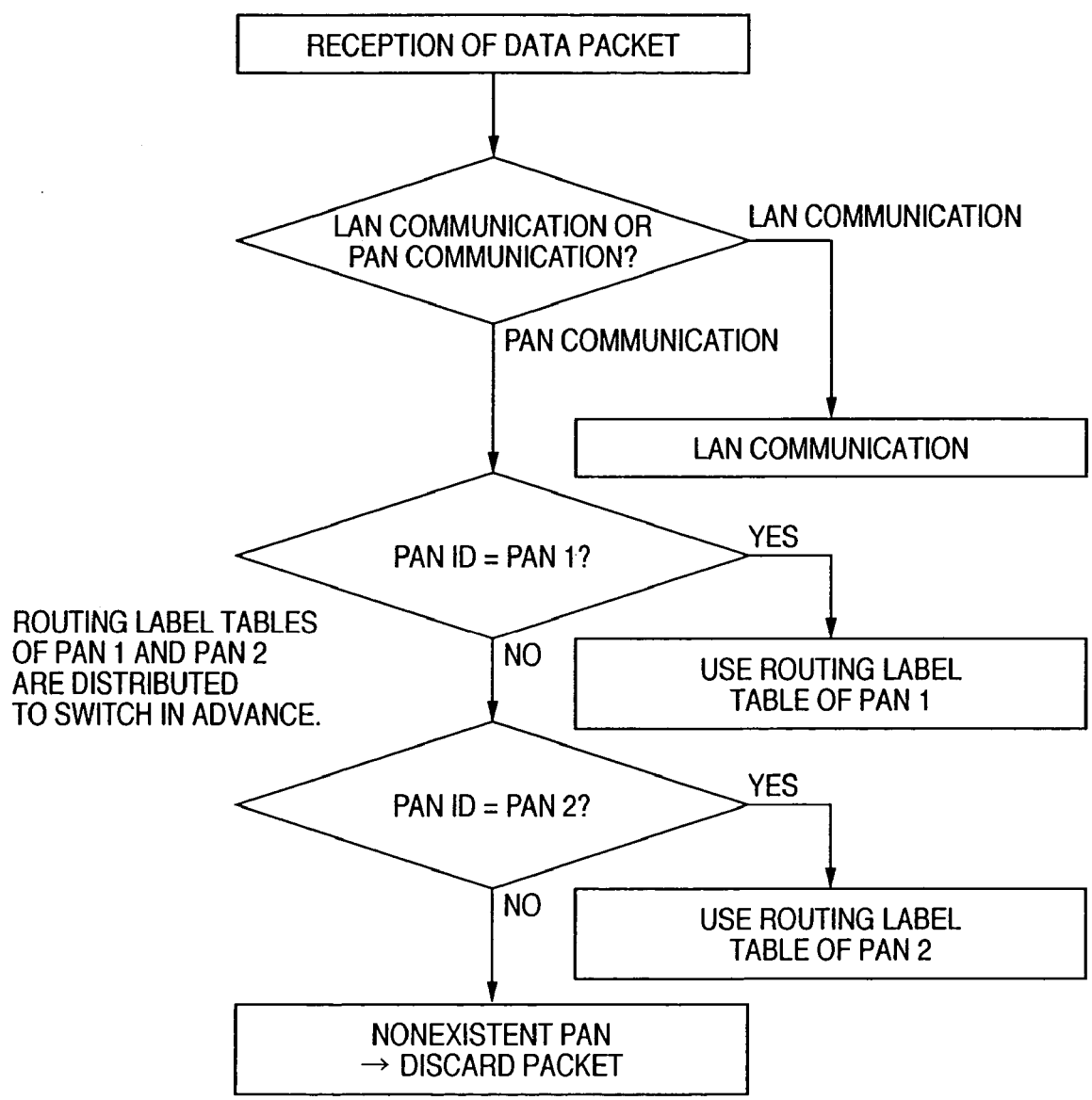
FIG. 12 is a flowchart showing the process sequence of the connection switch.

Routing label tables for the configuration of FIG. 9 are illustrated in FIGS. 11A and 11B, and independently generated within PAN 1 and PAN 2. That is, routing label tables exist for the respective PANs and correspond to them. Since the PANs respectively have unique PAN IDs, PAN 1 and PAN 2 can be maintained as different PAN planes whose communications are completely separated from each other, by executing routing label table selection operation based on the PAN ID as shown in FIG. 12 at each port of the connection switch.

The above-described "management session" is summarized as follows.
1. The label is always set by the PAN server in a session different from the "communication session". The label designates an entire route up to the end terminal (in the trunk system, the label closes within a switch and uses different values between switches. That is, the label is swapped between switches). The label is unique within one PAN and closes within the PAN. By grouping, a plurality of PANs can be configured.
2. The "setting session" includes the "initial setting session" of the PAN and the "update session" after construction.
3. The "distribution session" of the label follows the PAN initial setting session and PAN update session, and individual label tables are distributed to terminal devices and connection switches. After that, the session can shift to the "communication session" of the PAN.

The label in the embodiment is a mechanism given by only the PAN administrator, i.e., the management session of the PAN server. The security is maintained by generating and managing a label separately from the communication session. In other words, the terminal device itself cannot generate any label.

Communication between terminal devices within the PAN, i.e., the communication session will be described in detail.

When the PAN server activates the "communication session", terminal devices can perform PAN communication. In the communication session, terminal devices and connection switches perform the following operation.
1. An originating terminal device assigns a label (in the trunk MPLS, an edge router assigns a label). Since the PAN is configured within the LAN, the originating terminal device dynamically selects PAN communication or LAN communication.
2. The connection switch identifies whether the data packet is a LAN data packet or PAN data packet, and selects a switching method. The connection switch performs general address communication in the LAN, and label switching in the PAN. Transmission by PAN communication is processed with an absolute priority to transmission by LAN communication, which realizes isochronous data transmission.

As an actual implementation, the embodiment discloses a label error check method, label table cache method, and the like.

3. Based on a held correspondence table, a destination terminal device confirms and authenticates the PAN ID and label value of the transmission source that are contained in the received data packet. If the PAN ID and label value coincide with those in the table, the destination terminal device receives the data packet.

As shown in FIG. 16, the communication session is formed by
communication start state
label communication state
communication end state In the communication start state, whether the connection switch can start communication is determined in response to a PAN communication start request from the originating terminal device, and a communication permission response is sent back to the originating terminal device. At this time, a communication route corresponding to the full-routing label changes to a use-reserved state.

The connection switch determines whether to permit communication on the basis of the following criteria:
whether the full-routing label exists in the routing label table.
whether congestion occurs due to the presence of preceding communication in the transmission route.

In the label communication state, a PAN communication packet from the originating terminal device is output to a predetermined port by label switching operation.

In the communication end state, the label communication state ends, and the use-reserved state of the communication route corresponding to the full-routing label is canceled.

In order to explain the communication session in more detail, the frame format of a PAN data packet used in the communication session will be described with reference to FIG. 13.

Figure 13:
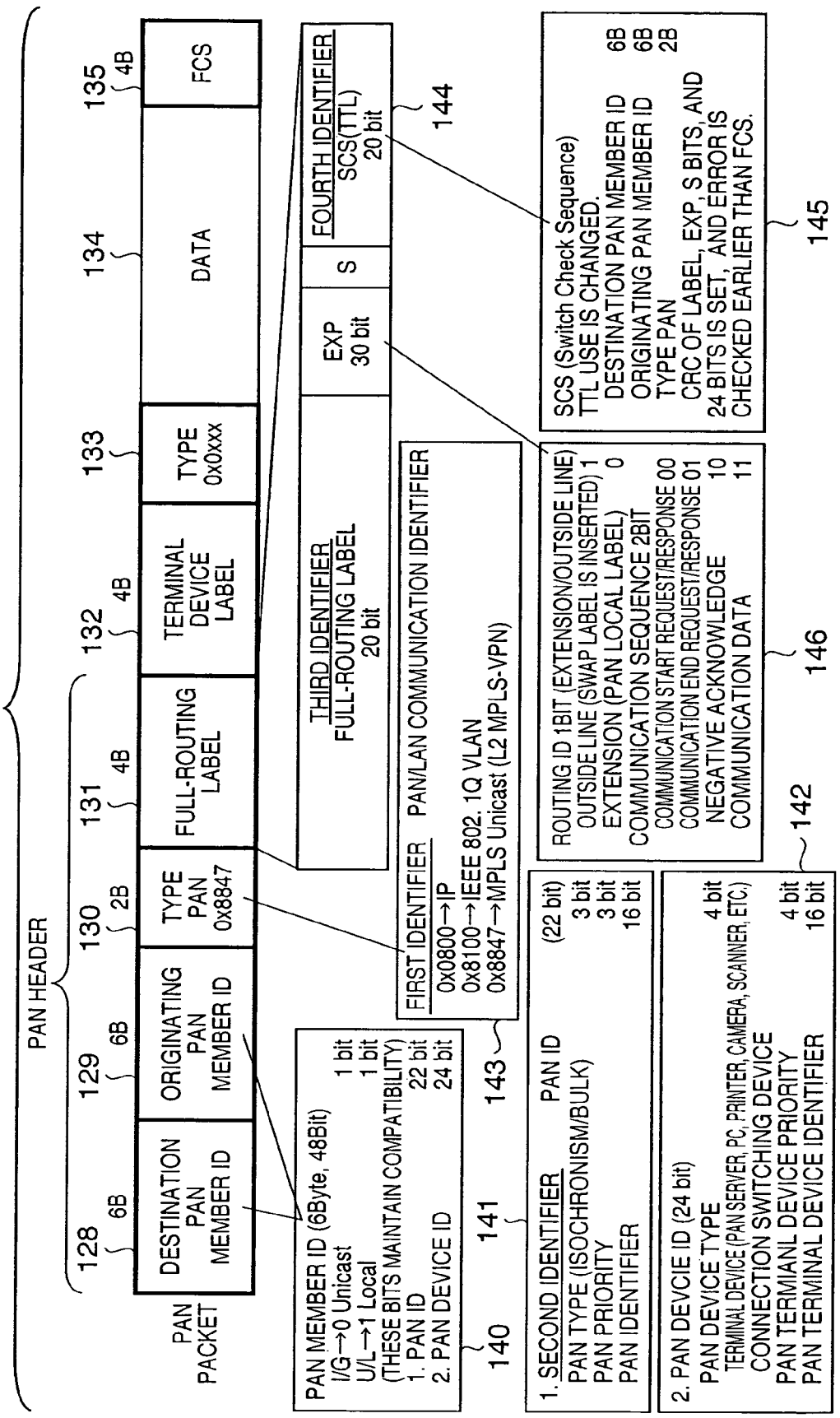
FIG. 13 is a view showing the frame format of the PAN communication method.

In FIG. 13, reference numeral 128 denotes a destination PAN member ID; and 129, an originating PAN member ID. Reference numeral 130 denotes a PAN/LAN communication identifier representing whether communication is PAN communication or LAN communication; 131, a full-routing label; 132, attribute data used between terminal devices; and 133, a type field which defines the protocol of subsequent data. Reference numeral 134 denotes a data payload; and 135, a frame check sequence.

Reference numeral 140 denotes a detailed content of the PAN member ID that is mainly formed by a PAN ID and PAN device ID.

Since switching operation is done on the basis of the routing label in PAN communication, the destination MAC address (DA) and originating MAC address (SA) fields can be used for various PAN identifiers. Note that "1" is set at the local bit of the MAC address so as not to adversely affect the MAC address (used for LAN communication) of a general Ether. Even if a packet flows through an existing LAN hub, the address is not interpreted as a global MAC address as far as the local bit is set.

Reference numeral 141 denotes the contents of the
PAN ID that is formed by
PAN type (isochronism or not)
PAN priority
PAN identifier Reference numeral 142 denotes the contents of the PAN device ID that is formed by
PAN device type
PAN terminal device priority
PAN terminal device identifier Reference numeral 143 denotes the contents of a field which contains a PAN/LAN communication identifier. In this case, 0x8847 is used as an identifier representing PAN communication. "0x8847" represents an MPLS packet, and means that a routing label follows.

Reference numeral 144 denotes a label format which is defined by the MPLS and used by the full-routing label in the embodiment.

Reference numeral 145 denotes a use method of the TTL area in the MPLS label format according to the present invention. A CRC is calculated using a destination PAN member ID, originating PAN member ID, type, label, EXP, and S, and the CRC value is so set as to achieve label switching earlier than FCS. SCS (Switch Check Sequence) implements high-speed label switching operation without any error.

Reference numeral 146 denotes a use method of the EXP area in the MPLS label format in the embodiment. The first one bit contains identification information (routing ID) representing whether the label is a PAN local label in order to establish matching with the edge router (FIG. 22) of the trunk MPLS network. With the identification information, the edge router can determine that a trunk MPLS label is inserted after a PAN label by the label stack in transfer to the trunk MPLS network. This can prevent erroneous swapping of the PAN label itself.

The remaining two bits in the EXP area are used for a communication sequence in the communication session. More specifically, these two bits represent four states:
communication start request/response
communication end request/response
negative acknowledge
communication data The embodiment employs the label field so as to apply the MPLS method, but an original method can also be employed.

Figure 14:
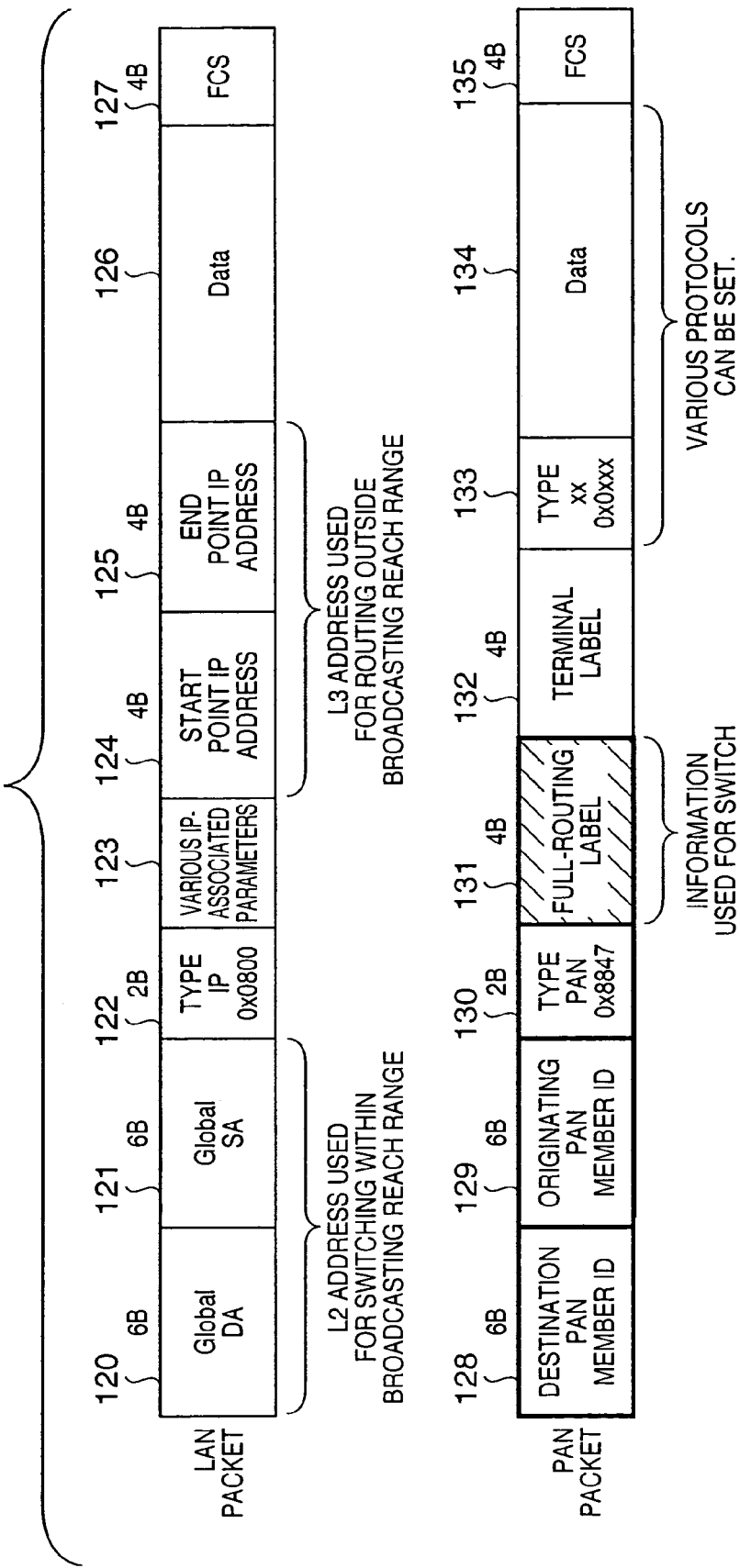
FIG. 14 is a view showing a comparison between PAN and LAN frame formats.

FIG. 14 shows a comparison between the frame formats of LAN and PAN data packets.

In FIG. 14, the upper stage represents the frame format of a data packet in a conventional LAN communication method. Reference numeral 120 denotes a MAC address of a destination terminal device; 121, a MAC address of an originating terminal device; and 122, an Ether type field which defines the protocol of subsequent data and contains 0x0800 representing a general IP packet for the LAN. Reference numeral 123 denotes attribute information on the IP packet; 124, an IP address of the originating terminal device; 125, an end IP address; 126, a data payload; and 127, a frame check sequence which contains a CRC for detecting a frame error.

In FIG. 14, the lower stage represents the frame format of a data packet in the PAN communication method according to the embodiment, similar to FIG. 13.

Reference numeral 128 denotes a destination PAN member ID; 129, an originating PAN member ID; 130, a PAN/LAN communication identifier; 131, a full-routing label; 132, attribute data used between terminal devices; and 133, a type field which defines the protocol of subsequent data. Reference numeral 134 denotes a data payload; and 135, a frame check sequence.

As shown in FIG. 14, the originating MAC address is stored in the originating address of a general network frame (in the embodiment, Ether header). In PAN communication, not the MAC address but the PAN member ID is stored.

Figure 25:
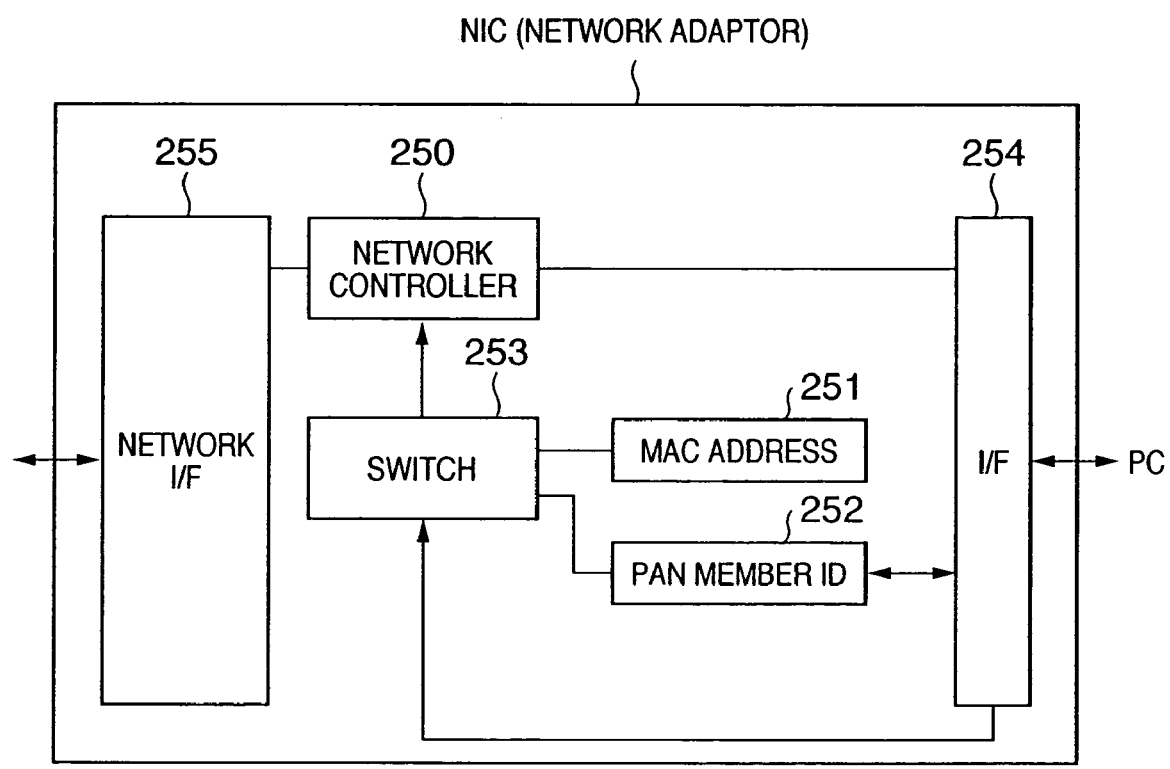
FIG. 25 is a block diagram showing a network adaptor in the embodiment.

In order to cope with the two methods, the LAN adaptor (NIC) in the embodiment has, e.g., a structure shown in FIG. 25. In FIG. 25, reference numeral 250 denotes a network controller chip; 251, a register (nonvolatile memory) which stores the MAC address of the LAN adaptor; and 252, a 6-byte rewritable register. Reference numeral 253 denotes a switch which selects either the register 251 or 252. Reference numeral 254 denotes a PC interface which is a PCI interface when the interface is incorporated in a PC or a USB or IEEE1394 interface when the interface is an external one. Reference numeral 255 denotes a network interface which is an RJ-45 connector for connection to a switch in the embodiment.

When the PAN member ID of a terminal device having this adaptor is decided, it is written in the register 252. The LAN frame and PAN frame can be switched at a desired timing by issuing a switching instruction to the switch 253 from the PC (accurately, the CPU of the PC).

The operation of the communication session will be described in detail with reference to FIG. 15.

Figure 15:
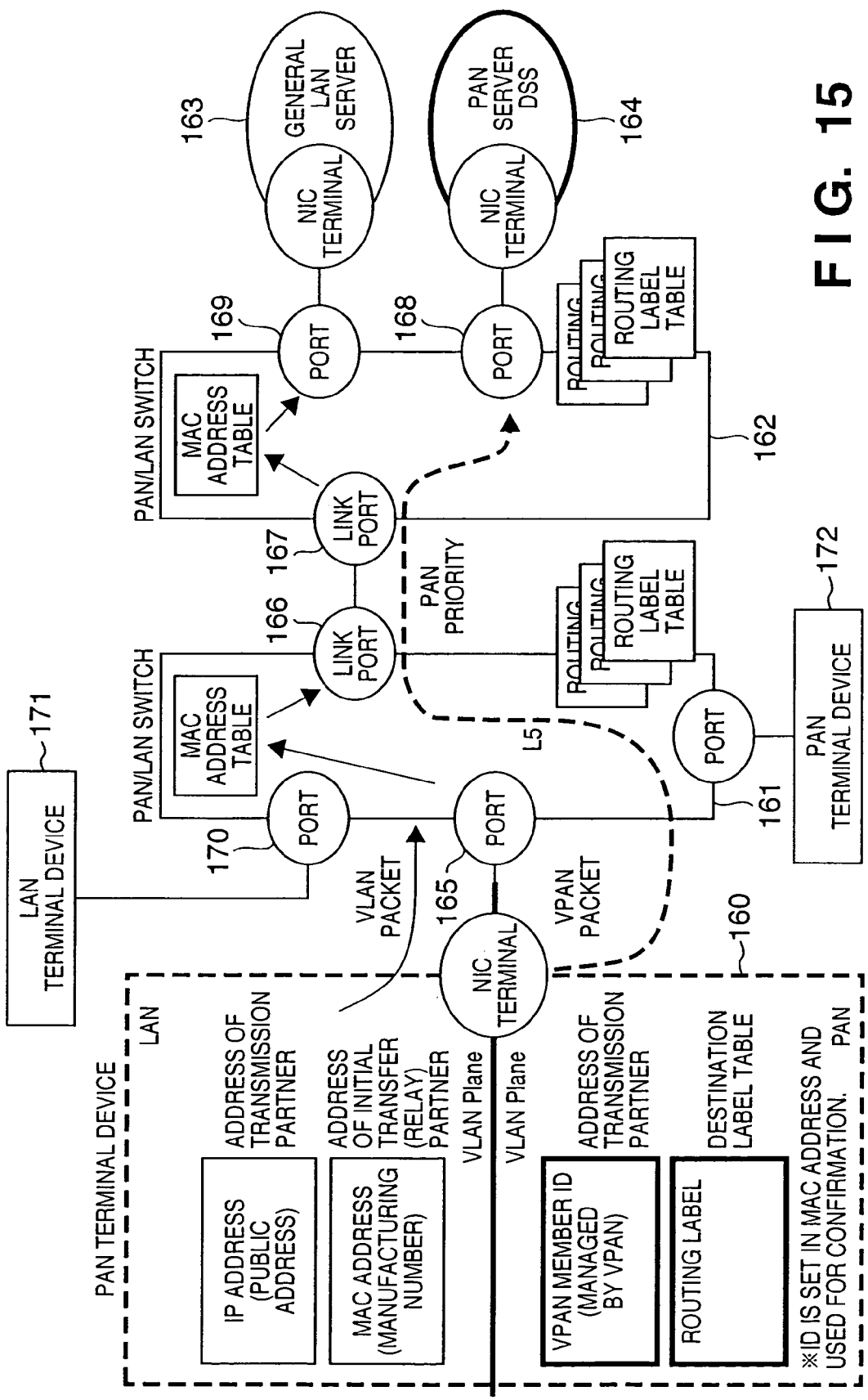
FIG. 15 is a view for explaining a communication session.

In FIG. 15, reference numeral 160 denotes a terminal device having a communication I/F which copes with both LAN communication and PAN communication; 161 and 162, connection switches which cope with both LAN communication and PAN communication; 163, a LAN server belonging to the LAN; 164, a PAN server belonging to the PAN; 171, a LAN terminal device; and 172, a PAN terminal device.

The connection switches 161 and 162 shift to the communication session in accordance with an instruction from the PAN server 164.

In the communication session, predetermined routing label tables have already been distributed to connection switches and PAN terminal devices. Routing label tables exist by the number of corresponding PANs.

The PAN terminal device 160 uses a LAN communication packet in FIG. 14 for general access to a LAN device, and accesses, e.g., the LAN server 163. The PAN terminal device 160 uses a PAN communication packet in FIG. 14 for specific access to a PAN device, and accesses, e.g., the PAN server 164 by PAN communication.

For the LAN packet, the MAC address of a destination terminal device in the DA (120 in FIG. 14), the MAC address of an originating terminal device in the SA (121 in FIG. 14), 0x0800 representing an IP (LAN) in the type field, and an IP header and the like are used on the basis of a predetermined standard.

For the PAN packet, the destination PAN member ID formed by the PAN ID (141 in FIG. 13) and PAN device ID (142 in FIG. 13), an originating PAN member ID, 0x8847 representing a PAN packet, and a routing label are used.

The LAN communication packet and PAN communication packet from the PAN terminal device 160 are input to an input port 165 of the connection switch 161.

The connection switch 161 refers to the type field (122 or 130 in FIG. 14) of an input packet, and determines whether the communication is LAN communication or PAN communication, as shown in FIG. 12.

When the type is 0x0800 representing a LAN communication packet, the connection switch 161 floods (broadcasts) the packet, and the flooding packet reaches the connection switch 162 via ports 166 and 167. The connection switch 162 similarly floods the packet, and the flooding packet reaches the LAN server 163.

When the LAN server responds to the packet, the MAC addresses of the terminal device and LAN server are registered in the MAC address tables (correspondence tables between ports and MAC addresses) of the connection switches 161 and 162, and LAN communication is executed. Details of the sequence of registration in the MAC address table has been described above, and a detailed description thereof will be omitted.

In this fashion, the terminal device 160 and LAN server 163 communicate with each other via the LAN.

When the type is 0x8847 representing a PAN communication packet, the connection switch 161 performs a PAN communication process on the basis of the PAN identifier (141 in FIG. 13).

The communication session in PAN communication is formed by
1. communication start state
2. label communication state
3. communication end state These states correspond to the remaining two bits (146 in FIG. 13) of the EXP area. More specifically,
1. communication start state
   communication start request/response (00)
   negative acknowledge (10)
2. label communication state
   communication data (11)
3. communication end state
   communication end request/response (01)
   negative acknowledge (10)

In PAN communication, the first packet is a communication start request in the communication start state. As shown in FIG. 16, the connection switch sends back a communication permission response to the originating terminal device under predetermined conditions. The operation of the connection switch at this time is as follows.

Figure 17:
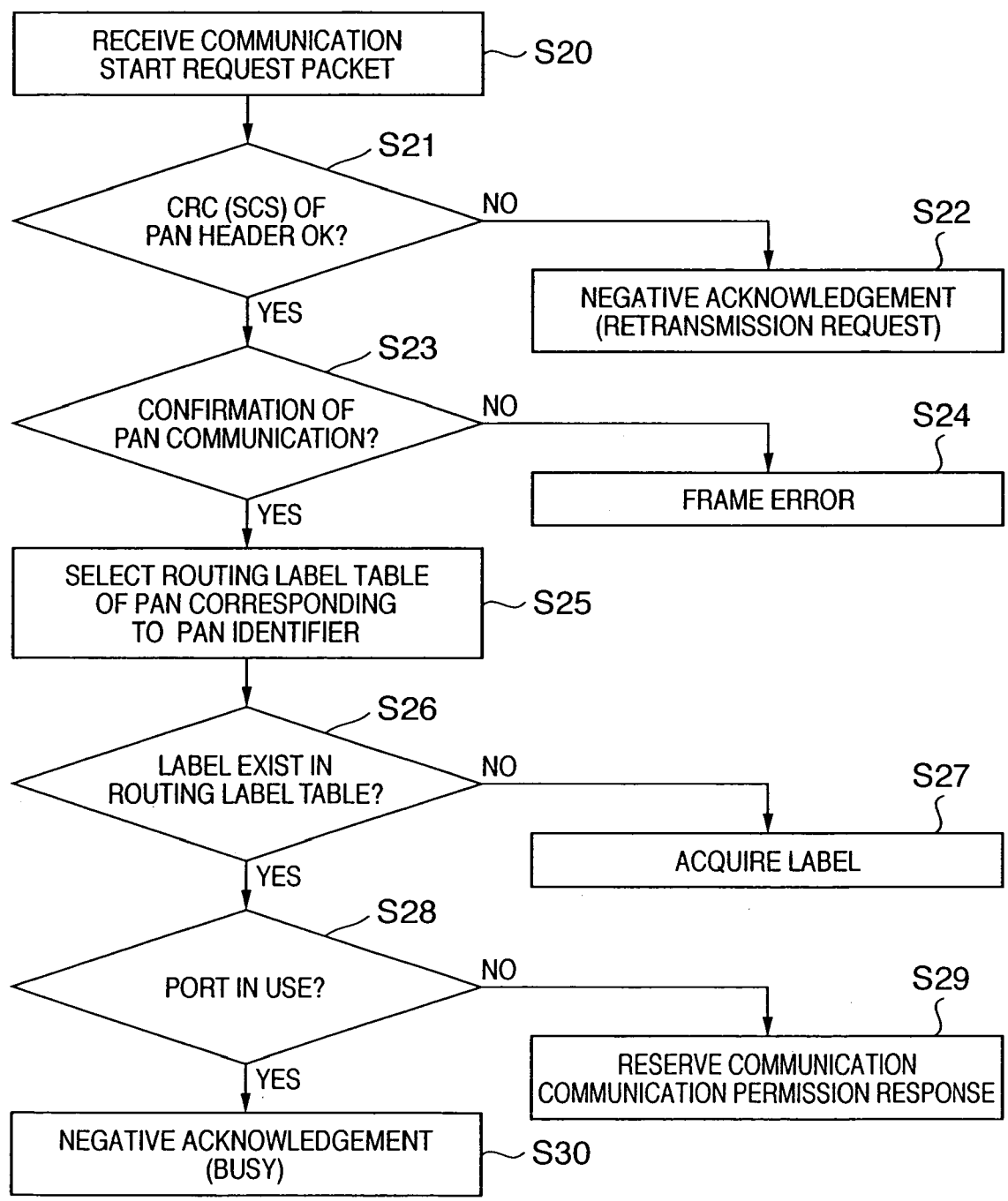
FIG. 17 is a flowchart showing the process sequence of a PAN communication start state in the connection switch.
Figure 18:
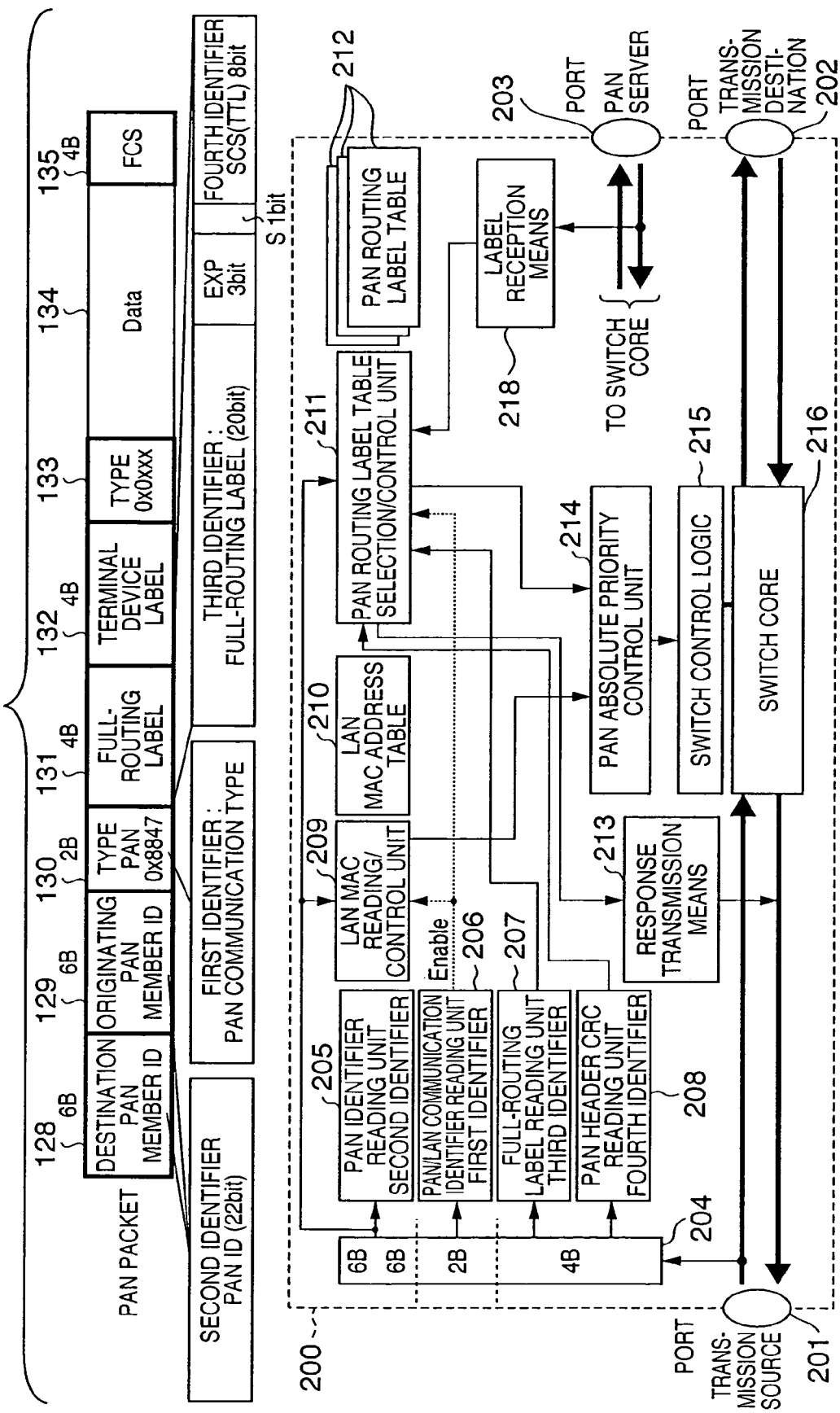
FIG. 18 is a view showing the blocks of the connection switch and the relationship with the frame in the embodiment.

FIG. 18 is a block diagram showing the connection switch according to the embodiment. FIG. 17 shows the process sequence of the connection switch.

In FIG. 18, reference numeral 200 denotes an entire connection switch; 201, 202, and 203, ports of the connection switch; 204, a buffer memory which stores the headers of packet data input to ports; 205, a PAN identifier reading unit; 206, a PAN/LAN communication identifier reading unit; 207, a full-routing label reading unit; 208, a PAN header CRC reading unit; 209, a MAC address reading/control unit in LAN communication; 210, a MAC address table in LAN communication; 211, a routing label table selection/control unit in PAN communication; 212, a plurality of PAN routing label tables (RAMs); 213, a response packet transmission unit; 214, a PAN absolute priority control unit; 215, a switch control logic; 216, a switch core; and 218, a label reception unit.

When a communication start request packet from an originating terminal device is received at the port 201 in FIG. 18, the buffer memory 204 stores a PAN header (see FIG. 13) of 18 bytes (=6B+6B+2B+4B) following the preamble.

After the end of storage, the PAN header CRC reading unit 208 calculates a CRC and confirms whether the received packet data does not have any error (step S21 in FIG. 17).

If the CRC has an error, the PAN routing label table selection/control unit 211 controls the response transmission unit 213 to send back a negative acknowledge containing retransmission request information to the originating terminal device (S22 in FIG. 17).

If the CRC has no error, the PAN routing label table selection/control means 211 executes a predetermined process on the basis of the determination result of the PAN/LAN communication identifier reading unit 206.

That is, if the data packet is not a PAN communication packet, a process of, e.g., discarding the packet as a frame error is done (S24 in FIG. 17).

If the data packet is a PAN communication packet, the PAN routing label table selection/control unit 211 selects a corresponding routing label table from a plurality of PAN routing label tables 212 on the basis of determination information of the PAN identifier reading unit 205 (S25 in FIG. 17).

Whether label information read by the full-routing label reading unit 207 exists in the selected routing label table is determined (S26 in FIG. 17). If NO in step S26, the PAN routing label table selection/control unit 211 controls the label reception unit 218 to perform, e.g., a label acquisition process from the PAN server (route management server) (S27 in FIG. 17). The absent label acquisition process from the external server is effective for saving of the cache memory in the connection switch. Labels with high use frequencies are held in the connection switch, and labels with low use frequencies are discarded. This can save the limited cache memory of the connection switch. In place of acquisition from the external server, a large-capacity storage means such as a flash memory may be held in the connection switch, and labels may be acquired from this secondary storage means.

If the label exists in the selected routing label table, the PAN routing label table selection/control unit 211 confirms whether a PAN packet is in use at any port on a route corresponding to the label (S28 in FIG. 17). If no PAN packet is in use, the PAN routing label table selection/control unit 211 sets a communication reservation flag, and controls the response transmission means (213 in FIG. 18) to send back a communication permission response (S29 in FIG. 17). If the PAN packet is in use, the PAN routing label table selection/control unit 211 controls the response transmission unit 213 to send back a negative acknowledge (busy) to the originating terminal device (S30 in FIG. 17). The terminal device which has received the communication permission response shifts to the label communication state (2 in FIG. 16).

When two connection switches exist, as shown in FIG. 15, the above operation of the connection switch is executed by the respective connection switches (161 and 162 in FIG. 15) together with the originating terminal device.

More specifically, when the terminal device issues a PAN communication start request to the PAN server (164 in FIG. 15), the terminal device receives communication permission responses from the connection switches (161 and 162 in FIG. 15). These processes can be done by the PAN server at once. However, in order to enable communication even when the PAN server itself is OFF, each connection switch sends back a communication permission response in the embodiment.

The operation flow of the label communication state (2 in FIG. 16) will be explained with reference to FIG. 19.

Figure 19:
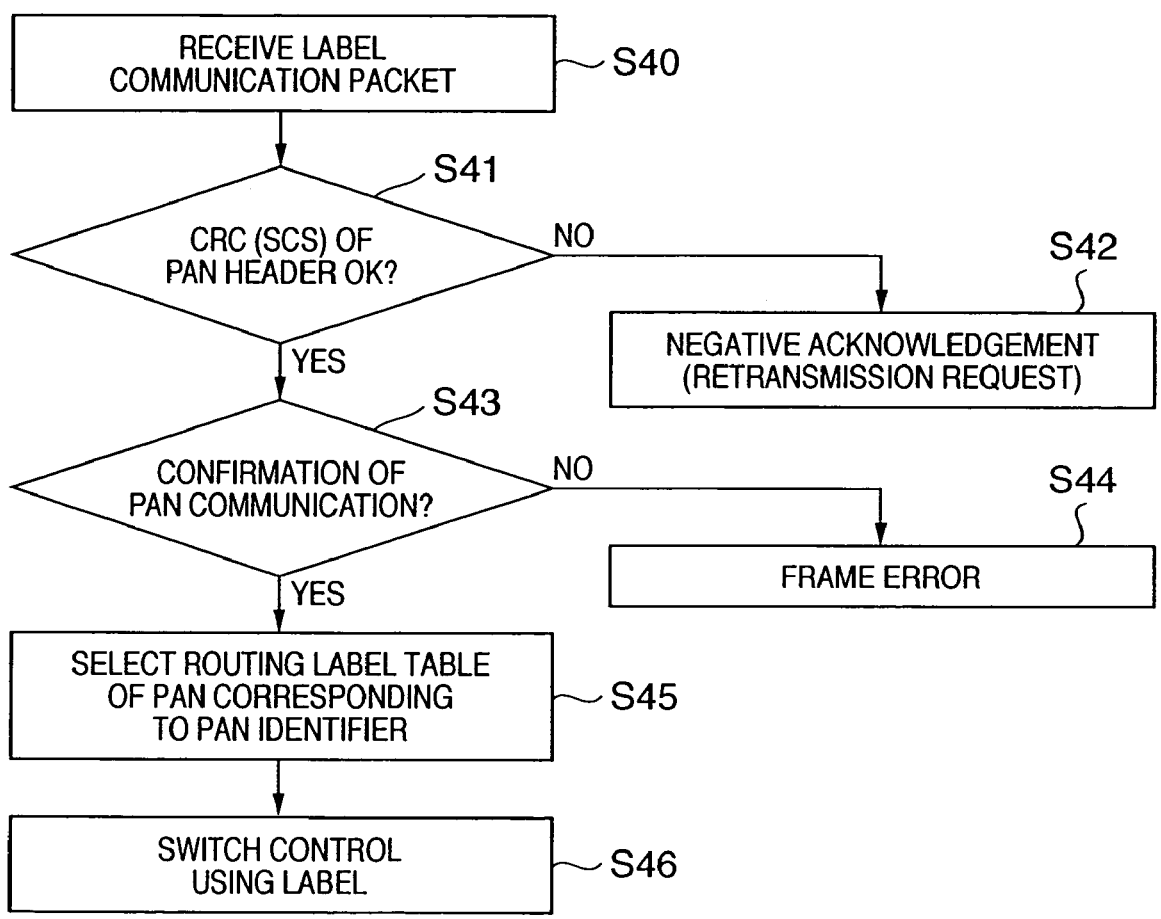
FIG. 19 is a flowchart showing the process sequence of a PAN label communication state in the connection switch in the embodiment.

Steps S40 to S45 in FIG. 19 are the same as steps S20 to S25 in FIG. 17, and a description thereof will be omitted.

In step S46, switch control is performed using the full-routing label. The PAN routing label table selection/control unit 211 controls the PAN absolute priority control unit 214 on the basis of label information from the full-routing label reading unit 207, and forcibly switches the switch control logic 215 to switch control based on the label. The switch core 216 outputs a PAN label communication packet to a predetermined port.

For example, when the full-routing label to the PAN server (164 in FIG. 15) is L5, a PAN packet is output to the link port 166 on the basis of a predetermined routing label table based on L5. The connection switch 162 executes the same process for a packet input from the link port 167, and switches the PAN packet to an output port 168.

Consequently, the PAN terminal device (160 in FIG. 15) and the PAN server (164 in FIG. 15) achieve PAN communication.

A reply PAN packet from the PAN server (164 in FIG. 15) to the PAN terminal device (160 in FIG. 15) uses another label, but PAN communication is done by the same operation.

The operation of PAN absolute priority control will be explained in more detail.

The LAN terminal device 171 (see FIG. 15) can communicate via the LAN with the LAN server 163 (see FIG. 15) using a LAN communication packet. When the timing of a LAN communication packet output from the LAN terminal device 171 and that of a PAN communication packet output from the PAN terminal device 160 (see FIG. 15) coincide with each other, congestion occurs at the link port 166 of the connection switch 161 (FIG. 15). PAN communication aims at processing of data which has high isochronism or confidentiality and requires a priority process. Thus, the connection switch 161 performs output priority control of a packet at the link port 166 as follows.

1. When a PAN communication packet is input during output of a LAN communication packet to the port 166, the PAN communication packet quickly replaces the LAN communication packet and is output. At this time, the LAN packet is broken, but retransmission control is done by the TCP/IP protocol and no problem arises.
2. When a LAN communication packet is input during output of a PAN communication packet to the port 166, the LAN communication packet is queued and waits till the end of outputting the PAN communication packet.

In this manner, the PAN communication packet always undergoes the congestion process at each connection switch with an absolute priority over a LAN communication packet.

Congestion control between PAN communication packets will be explained.

The PAN terminal device 172 can communicate with the PAN server 164 via the PAN using a PAN communication packet (see FIG. 15).

When the timing of a PAN communication packet output from the PAN terminal device 160 and that of a PAN communication packet output from the PAN terminal device 172 coincide with each other, congestion occurs at the link port 166 of the connection switch 161. In this case, the connection switch 161 performs the following output priority control.

Case in Which Congested PAN Communication Packets are of the Same Type (Isochronism or Bulk)
1. When a new PAN communication packet is input during output of another PAN communication packet to the port (166 in FIG. 15), the connection switch 161 sends back a "busy" negative acknowledge (S30 in FIG. 17) to the originating PAN terminal device by a PAN communication packet without switching to the new PAN communication packet. At this time, the originating ID is registered in the busy queue, and at the end of the preceding PAN communication, a ready message is transmitted to the originating PAN terminal device.
2. Priority Process Method of PAN Communication Packet Registered in Busy Queue A queue process may be done on the basis of, e.g., the following priority policy using the PAN type bit and PAN priority bit contained in the PAN ID, and the PAN device type bit and PAN terminal device priority bit contained in the PAN device ID (see FIG. 13).

PAN Type (Isochronism/Bulk)
    PAN priority (priority for the same PAN type)
        PAN device type (priority for the device type in predetermined PAN)

PAN terminal device priority (priority for identical devices)

Case in Which Congested PAN Communication Packets are Isochronous Packet and Bulk Packet An isochronous PAN communication packet undergoes a congestion process with an absolute priority to a bulk (general) PAN communication packet on the basis of isochronism identification information (contained in the PAN type). At this time, the bulk PAN communication packet is broken, but retransmission control can be done on an upper layer and no problem arises.

The operation flow of the communication end state will be explained (3 in FIG. 16).

Figure 20:
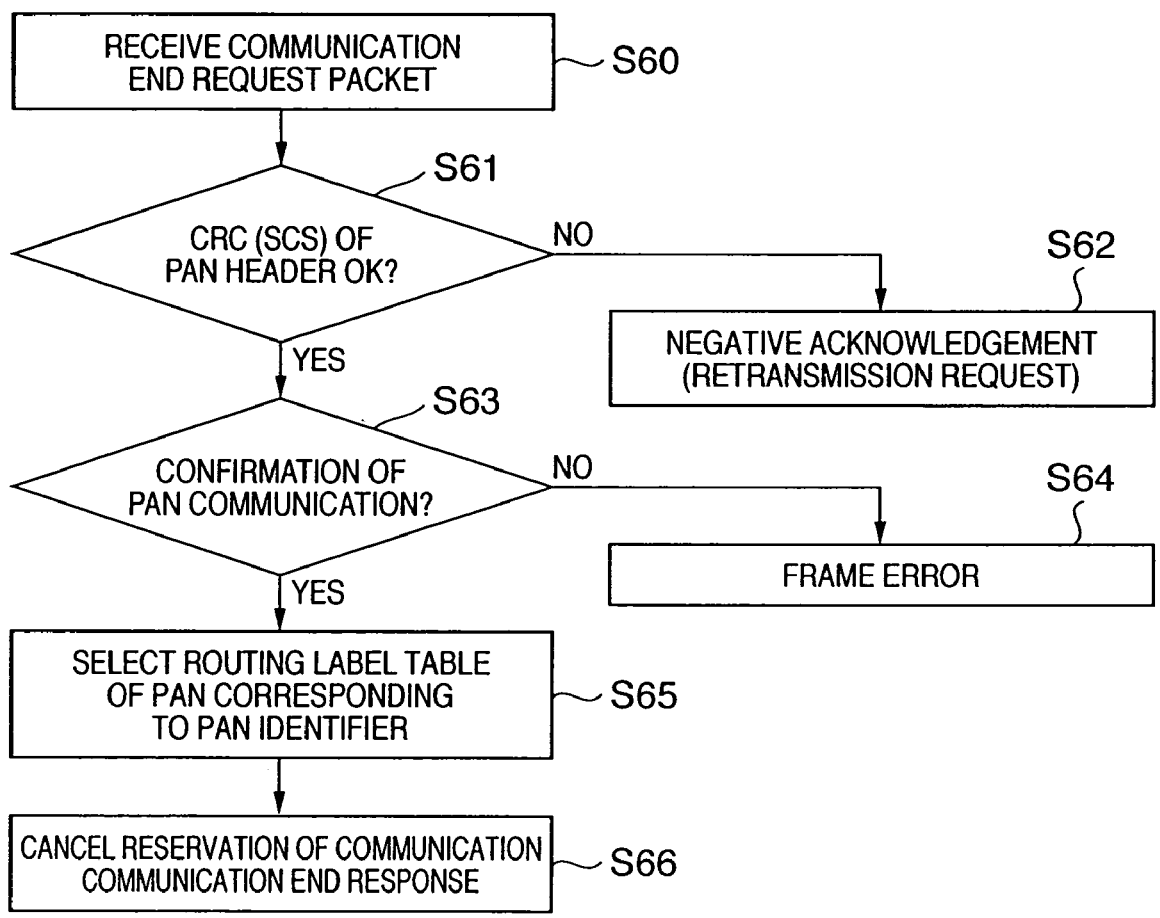
FIG. 20 is a flowchart showing the process sequence of a PAN communication end state in the connection switch in the embodiment.
Figure 21:
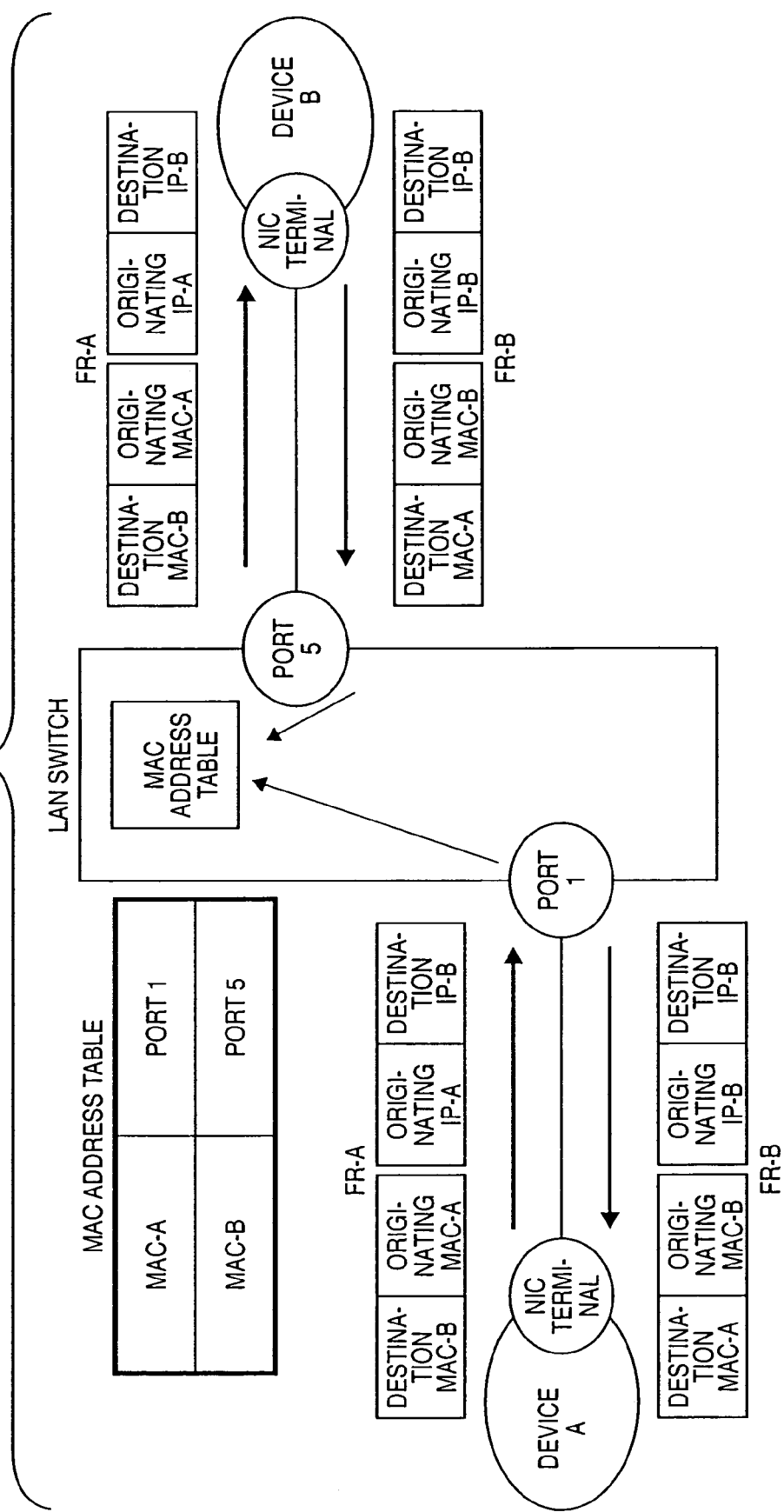
FIG. 21 is a view for explaining a communication method in an existing LAN.

The operation of the communication end state is shown in FIG. 20. In FIG. 20, steps S60 to S65 are the same as steps S20 to S25 in FIG. 17, and a description thereof will be omitted.

In step S66, communication reservation is canceled. The PAN routing label table selection/control unit 211 (see FIG. 18) cancels a communication reservation flag corresponding to a corresponding full-routing label, and controls the response transmission unit 213 (see FIG. 18) to send back a communication end response to the originating terminal device. Accordingly, a series of communication operations in the communication start state and label communication state end.

In the above description, the connection tree of terminal devices is created for PAN device IDs in the "initial setting session". Routing labels are distributed to connection switches and terminal devices in the "distribution session". PAN communication is established in the "communication session". Operation of setting a route between terminal devices upon detection of the start of communication, assigning a label, and starting PAN communication will be explained.

Processes up to creation of the connection tree of all routes in the connection example shown in FIG. 3 have been described in the "initial setting session".

In assigning a label at the start of communication, no routing label is assigned immediately after creation of the connection tree, and the state after creation of the connection tree is kept unchanged.

This means that steps up to step 4 of FIG. 1 are executed in the "initial setting session".

As for the connection routing table in FIGS. 5A and 5B, the table is created in this state, but the routing label column is blank.

Figure 26:
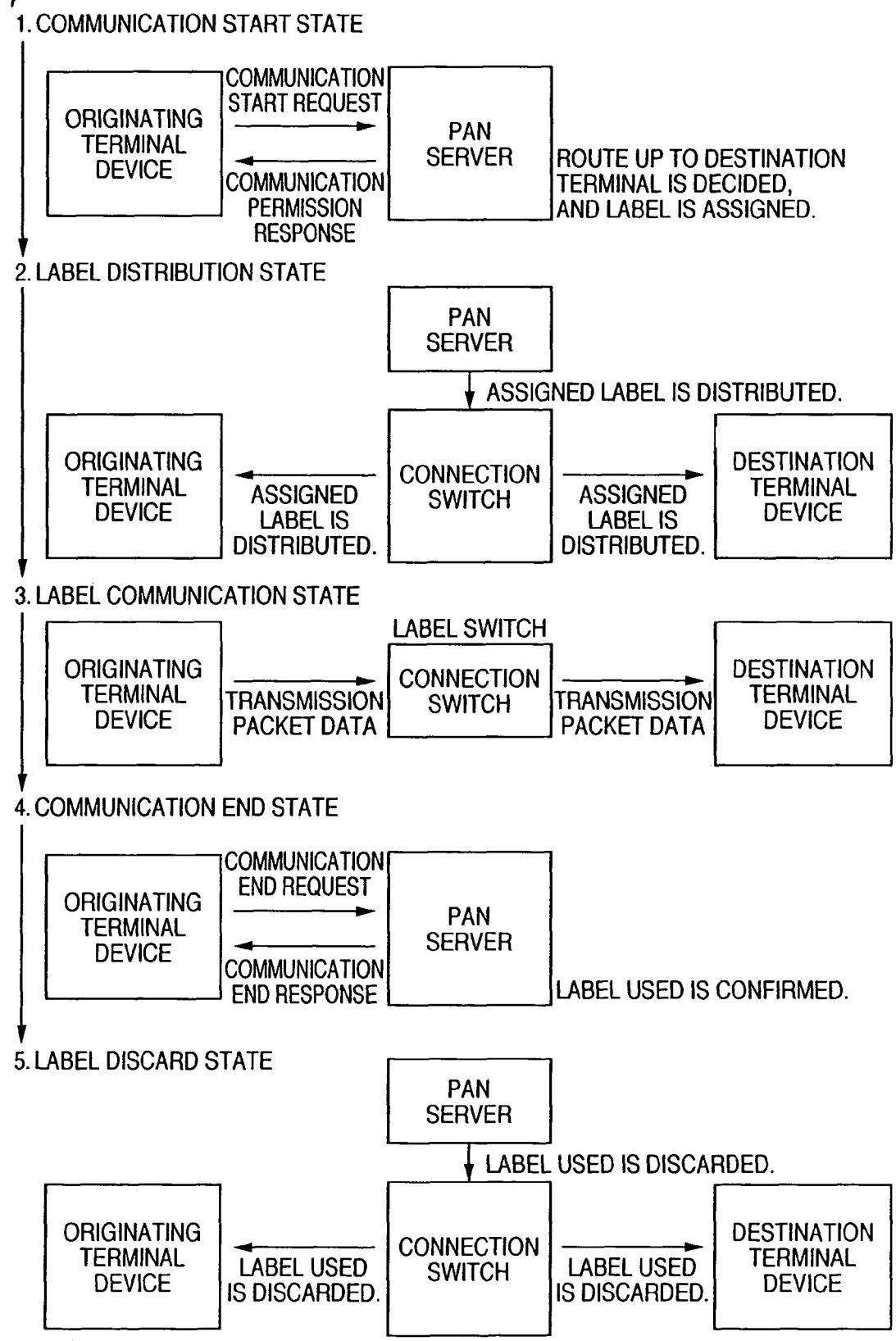
FIG. 26 is a view for explaining a label assignment method at the start of communication.

The states of the communication session from the start of communication of the first terminal device with the second terminal device from the above state to the end of communication will be explained with reference to FIG. 26.

In "1. communication start state", when the originating terminal device transmits a communication start request to the PAN server, the PAN server decides a route to the destination terminal device, and assigns a label.

This process is the same as label assignment in the initial setting session. In this case, a label is assigned to only a route through which the communication start request has been transmitted, whereas labels are assigned to all routes in the initial setting session.

As for the connection routing table in FIGS. 5A and 5B, a label assigned to the routing label column is set.

In "2. label distribution state", the PAN server notifies the originating terminal device, the destination terminal device, and all connection switches on the communication route of the assigned routing label.

Similar to the distribution session, the routing label is distributed to only the originating terminal device, destination terminal device, and connection switches on the route through which the communication start request has been transmitted, and is not distributed to another route.

By using the notified label, the originating terminal device and destination terminal device communicate with each other.

The "label communication state" is the same as the state in FIG. 16.

In "4. communication end state" at the end of communication, when the originating terminal device transmits a communication end request to the PAN server, the PAN server sends back a communication end response to the originating terminal device. This process is the same as the state in FIG. 16, and the label used is further confirmed in the connection routing table.

In "5. label discard state", the PAN server notifies the originating terminal device, the destination terminal device, and all connection switches on the communication route to discard the confirmed label used.

At this time, the PAN server blanks the routing label column of the connection routing table in FIGS. 5A and 5B. The originating terminal device, destination terminal device, and all connection switches on the route delete the label stored in them, and even if a packet of the same label is received later, discard the received packet.

The routing label column may be blanked upon reception of discard complication notifications from the originating terminal device, the destination terminal device, and all connection switches on the route, instead of a one-way notification from the PAN server.

This realizes effective use of the label, and after a label is discarded, no terminal device can communicate using the label. Even if the label is eavesdropped during communication, the network is not illicitly intruded after label discard, improving the security.

In this case, the destination terminal device serving as a communication start detection means transmits a communication start request. Alternatively, the originating terminal device may transmit a label request to the PAN server.

The "initial setting session" may execute processes up to label assignment without distributing any label.

This means that steps up to step 6 of FIG. 1 are executed in the "initial setting session".

Also in this case, assigned labels are distributed to terminal devices and connection switches on the communication route at the start of communication.

In this example, the communication traffic for distributing labels in the "initial setting session" can be suppressed, but many labels must be prepared.

It has not been described that when a label is to be assigned, a label different from one assigned to another route is assigned.

Figure 27:
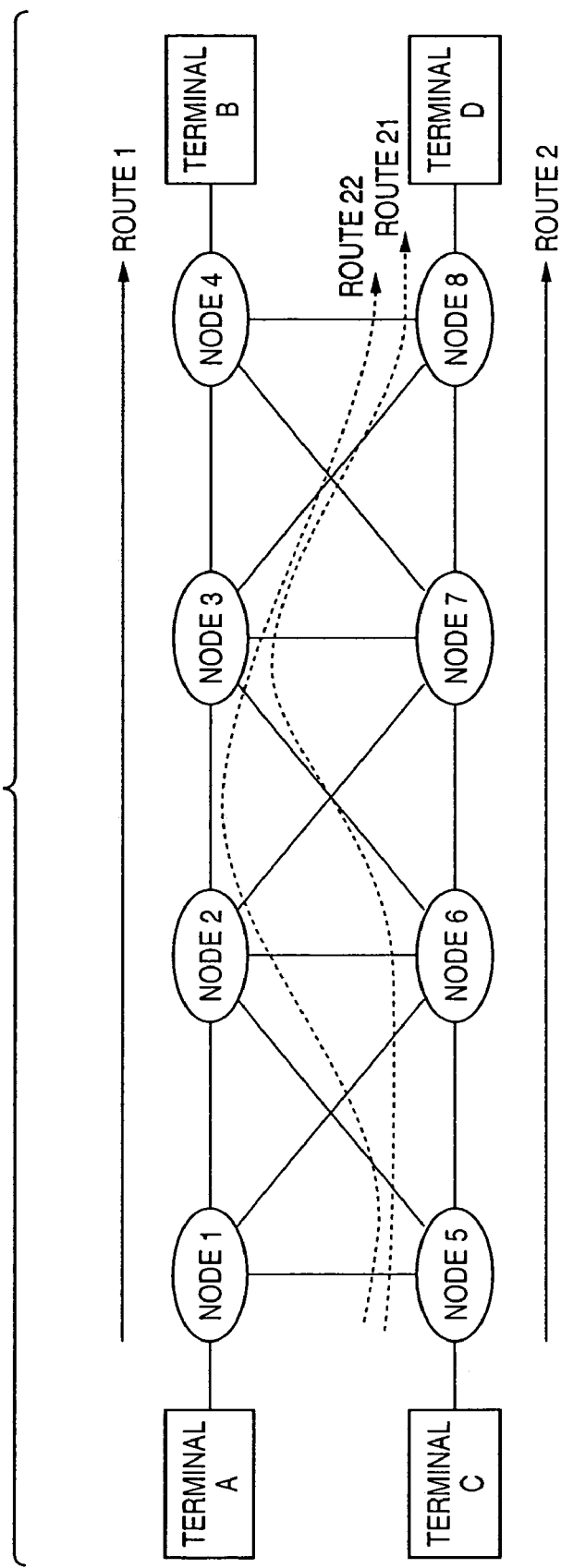
FIG. 27 is a view for explaining setting of an alternate route upon occurrence of a network fault.

For example, assuming a network configuration as shown in FIG. 27, route 1 and route 2 do not pass the same node (connection switch: this also applies to the following description). Thus, route 1 and route 2 can use the same label to perform communication.

More specifically, in assigning a label to route 1 between terminal A and terminal B, label 1 is assigned as a label commonly usable by node 1, node 2, node 3, and node 4. In searching for a label commonly usable by node 5, node 6, node 7, and node 8 on route 2 between terminal C and terminal D, the label is searched for independently of the label assigned to route 1. At this time, labels are searched for as a label usable on route 2 sequentially from smaller numbers. This general software method assigns label 1 to route 2, too.

However, the use of the same label on different routes may cause the following problem.

The network configuration in packet communication is generally designed in consideration of an alternate route upon occurrence of a fault. If the label is assigned in consideration of only the first set route, a packet may pass through nodes on another route assigned with the same label upon occurrence of a fault on the network.

If a fault occurs at node 7 on route 2 during communication using label 1 assigned to route 1 and route 2 in FIG. 27, terminal C and terminal D can keep communicating with each other via route 21 of node 5-node 6-node 3-node 8.

Since node 3 has already used label 1, one of measures 1) and 2) must be adopted.

1) At node 3, the transfer destination is decided from the input port and label.
2) A new label is assigned to a route (communication route 21) of node 5→node 6→node 3→node 8.

When a fault occurs at node 6 and node 7 on route 2, terminal C and terminal D can keep communicating with each other via route 22 of node 5→node 2→node 3→node 8. At this time, a new label must be assigned to communication route 22 because node 3 receives packets addressed to different destinations from the same port.

When a unique label is assigned to each route on the whole network,
1) Each node can decide a transfer destination port by using only the label of a received packet.
2) When a fault occurs on the route and an alternate route is set, only nodes on the alternate route suffice to be notified of the label.

For example, similar to the above case, the following operation is executed upon occurrence of a fault when terminal A and terminal B communicate with each other using label 1 on route 1 and terminal C and terminal D communicate with each other using label 2 on route 2.

On route 21 upon occurrence of a fault at node 7
1) No input port need be detected at node 3.
2) The transfer destination with label 2 does not change at node 5 and node 8, and no label need be reassigned.

Also, the transfer destination at node 8 does not change on route 22 upon occurrence of a fault at node 6 and node 7.

Hence, assignment of a unique label to each route on the whole network is significant.

According to the method of assigning a unique label to each route on the whole network, when labels are assigned to all routes on the whole network, they are sequentially assigned, as shown in FIGS. 5A and 5B. When labels are assigned at the start of communication so as not to overlap each other, the connection routing tables shown in FIGS. 5A and 5B can always be updated in label assignment and label discard, and all the connection routing tables can be searched for to assign a free label in assignment of a new label.

This method has already been utilized in various ways and is a known technique, and a detailed description thereof will be omitted.

The above-described operation is merely an example, and in some cases, only an operation necessary for the description has been explained. The embodiment is not limited to the above operation.

The illustrated configurations, label tables, flowcharts, formats, server windows, and the like are also merely examples, and the embodiment is not limited to the illustrated ones.

The terms used for the description are not limited to things meant by the terms, and include things which can be replaced with practical ones. For example, "terminal" may be "terminal" or "terminal+adaptor (including card)".

As described above, the embodiment implements a PAN communication method having the following functions.

1. One-to-one virtual direct connection using a full-routing label can be achieved between a given specific terminal device and another specific terminal device.
2. Since no flooding (broadcasting) is done, address information such as a MAC address or IP address does not leak.
3. Terminal devices which need not communicate with each other are not assigned with any full-routing label, and cannot achieve communication connection.
4. The frame format of the Ethernet can be maintained, and the PAN method can coexist with the LAN method.

A specific group area network (PAN) configured by only specific terminal devices is implemented within the LAN on the basis of the new PAN communication method.

Requirements for the PAN are as follows.

1. A PAN terminal device must be accessible to a LAN terminal device.
2. A LAN terminal device must not be accessible to a PAN terminal device.
3. Terminal devices in different PANs must not be accessible.

Of these requirements, 1 and 2 are met by the generation/distribution mechanism of the full-routing label and the label switching method in the PAN communication method. Requirement 3 is met by separately generating and managing a routing label table for each PAN.

As has been described above, the present invention can construct within the LAN a private area network (PAN) which is configured by terminal devices (personal computers and the like) of a specific group, is hardly influenced by the LAN traffic, and has high security.

Especially, no network peripheral device can perform advanced password check on the session layer. Even such device can securely transmit data by the PAN communication method.

The present invention can also implement channel separation between general LAN data and streaming data in the private area network within the LAN that is configured by specific multimedia terminal devices.

Streaming data can be supplied between terminal devices of a specific group without any influence of general LAN burst data.

Instead of performing creation and distribution of the full-routing label in the first session, a route from an originating terminal to a destination terminal is decided at the start of the communication session from the terminal device. A routing label is assigned to the set route, and the assigned routing label is distributed to the originating terminal, the destination terminal, and connection switches on the route. Thereafter, the communication shifts to PAN communication. At the end of the communication session, the use of the assigned routing label is stopped. This realizes effective use of the label within the private area network (PAN).

Also in assigning a label in each communication session, a label which is not identical to one that has already been assigned to another communication route and is in use is assigned. The routing label changes for each route, similar to creation and distribution of the full-routing label in the first session. When an alternate route is set to continue communication between terminal devices upon occurrence of a fault on one route in the private area network (PAN), the routing label in use can be kept used. Communication between terminal devices can continue by newly notifying only connection switches on the alternate route of a routing label.

As many apparently widely different embodiments of the present invention can be made without departing from the spirit and scope thereof, it is to be understood that the invention is not limited to the specific embodiments thereof except as defined in the appended claims.

Claim of Priority This application claims priority from Japanese Patent Application Nos. 2003-289158 filed on Aug. 7, 2003 and 2004-178403 filed on Jun. 16, 2004, which are hereby incorporated by reference herein.

What is claimed is:

1. A network system including a plurality of terminal devices and a plurality of switching apparatuses to configure a network for packet communication among the plurality of terminal devices, wherein each one of the switching apparatuses includes a plurality of connection ports for connecting to one or more of the plurality of terminal devices or one or more of the plurality of switching apparatuses, wherein one of the plurality of terminal devices serves as a full-routing management server by performing:

assigning a personal area network (PAN) member identifier (ID) to each of said plurality of terminal devices including the terminal device serving as the full-routing management server, each said PAN member ID being a unique identifier and being different from a MAC/IP address;

assigning a full-routing-label to each network connection path from one of the plurality of terminal devices to another one of the plurality of terminal devices, each said full-routing-label being a unique label and being defined by one or more of the plurality of switching apparatuses on the network;

generating a first-routing-label table for each said terminal device, wherein each said first-routing-label table includes the PAN member IDs of destination terminal devices, full-routing-labels indicating network connection paths to the destination terminal devices from the source terminal device, and names of all switching apparatuses on the network connection path indicated by each of the full-routing labels;

generating a second-routing-label table for each of the switching apparatuses, wherein each said second-routing-label table includes information indicating a relationship between a connection of an input connection port and an output connection port and each of the full-routing-labels;

distributing each said first-routing-label table to a corresponding terminal device on the network; and distributing each said second-routing-label table to a corresponding switching apparatus on the network, wherein each said terminal device performs:

storing the first-routing-label table distributed from the full-routing management server;

specifying one of the full-routing-labels indicating a network connection path to a destination of a packet, by using the stored first-routing-label table; and including the specified full-routing-label in a predetermined area of the packet and sending the packet to the network, and wherein each of said switching apparatuses performs:

storing the second-routing-label table distributed from the full-routing-management server;

in response to a reception of a packet via one of the connection ports, specifying a connection port for outputting the packet by using the full-routing-label included in the received packet and in the stored second-routing-label table; and outputting the packet via the specified connection port, and wherein transmission of a packet from an originator terminal device to one of the destination terminal devices is made using the full-routing-label included in the packet.

2. The network system according to claim 1, wherein each said switching apparatus provides one-to-one, full-routing-label-based, direct connection paths between the plurality of terminal devices connected to the connection ports, wherein each said switching apparatus includes:

a communication unit that transmits and receives a plurality of frames, each said frame including a personal area network (PAN) communication type identifier indicating that the frame is to be sent using a one-to-one, full-routing-label-based, direct connection path between two terminal devices, and the PAN member ID associated with at least one of the terminal devices using a PAN communication type;

a check unit that checks, when a received frame is received via one of the plurality of connection ports, whether a communication type of the received frame is the PAN communication type;

a selection unit that selects one of the full-routing-label tables corresponding to the PAN member ID included in the received frame; and a switching unit that, based on the full-routing-label table selected by the selection unit, connects an output connection port specified by the full-routing-label table and an input connection port that has received the received frame.

3. The network system according to claim 2, wherein each said switching unit includes a first switching control unit that connects the plurality of connection ports in accordance with the one-to-one full-routing-label table and the full-routing label, and a second switching control unit that connects the plurality of connection ports in accordance with MAC/IP addresses, and wherein the second switching control unit checks connected terminal devices and reports check results to the full-routing-management server.

4. The network system according to claim 1, wherein each switching unit includes a first switching control unit that connects two or more of the plurality of connection ports in accordance with the full-routing-label table and the one-to-one, full-routing-label information, and a second switching control unit that connects two or more of the plurality of connection ports in accordance with MAC/IP addresses, wherein each said switching unit prioritizes the first switching control unit over the second switching control unit by stopping the second switching control until while the second switching control until is connecting the two or more of the plurality of connection ports, if necessary, when a full-routing-label based packet and a MAC/IP address based packet conflict at an output port.

5. The network system according to claim 1, wherein each of the terminal devices forms a frame of a data packet including:

a destination PAN member ID;

an originator PAN member ID;

one of the full-routing-labels;

a PAN communication identifier indicating that a communication is to be made using one of the full-routing-labels;

a communication sequence identifier indicating a communication start, communication data, or a communication end of the communication to be made using the full-routing-label; and a CRC, wherein, when beginning or ending a communication, each one of the terminal devices includes, into a communication sequence identifier in a data packet to be sent to at least one of the destination terminal devices, a bit indicating a communication start request or a communication end request, and sends the packet to the at least one destination terminal device, and wherein each of the switching apparatuses specified by one of the full-routing-labels in a data packet performs:
  error correcting using a CRC in a received data packet, if the CRC indicates that at least one error is present;
  reserving or canceling of a reservation of two connection ports specified by the full-routing-label in the data packet; and including a response bit into a communication sequence identifier of a response packet and returning the response packet to an originating terminal of the data packet, wherein each of the switching apparatuses specified by the full-routing-label in the data packet maintains a connection of two connection ports specified the full-routing-label in the data packet until receiving the data packet including information indicating a communication end, after having received the data packet including information indicating a communication start, and wherein a connection path on each of the switching apparatuses between originating and destination terminal devices is maintained while a communication using one of the full-routing-labels is made.

* * * * *